(12) United States Patent
Lan et al.

(10) Patent No.: US 7,848,204 B2
(45) Date of Patent: Dec. 7, 2010

(54) HOLOGRAPHIC STORAGE AND REGENERATION SYSTEM HAVING SERVO MECHANISM

(75) Inventors: Yung-Sung Lan, Hsinchu (TW); Chih-Ming Lin, Hsinchu (TW); Tzuan-Ren Jeng, Hsinchu (TW)

(73) Assignee: Industrial Technology Research Institute, Hsin chu (TW)

( * ) Notice: Subject to any disclaimer, the term of this patent is extended or adjusted under 35 U.S.C. 154(b) by 732 days.

(21) Appl. No.: 11/762,661

(22) Filed: Jun. 13, 2007

(65) Prior Publication Data

US 2008/0252953 A1    Oct. 16, 2008

(30) Foreign Application Priority Data

Apr. 11, 2007    (TW) .............................. 96112743 A

(51) Int. Cl.
*G11B 7/00* (2006.01)
(52) U.S. Cl. ............................. 369/103; 359/3; 359/11; 359/30; 359/35; 359/112.1; 359/112.15
(58) Field of Classification Search ....................... None
See application file for complete search history.

(56) References Cited

U.S. PATENT DOCUMENTS

| | | | | |
|---|---|---|---|---|
| 6,721,076 | B2 * | 4/2004 | King et al. ..................... | 359/35 |
| 6,909,529 | B2 | 6/2005 | Curtis | |
| 7,167,286 | B2 * | 1/2007 | Anderson et al. ............. | 359/25 |
| 2002/0119279 | A1 * | 8/2002 | Ogawa ....................... | 428/64.4 |
| 2002/0145773 | A1 * | 10/2002 | Tanaka et al. ................. | 359/7 |
| 2004/0212859 | A1 * | 10/2004 | Tsukagoshi ................... | 359/15 |
| 2005/0128542 | A1 * | 6/2005 | Kim ............................ | 359/15 |
| 2007/0041302 | A1 * | 2/2007 | Kuroda ....................... | 369/103 |
| 2007/0076562 | A1 * | 4/2007 | Horimai ..................... | 369/103 |
| 2007/0285751 | A1 * | 12/2007 | Kim ............................ | 359/10 |
| 2008/0062486 | A1 * | 3/2008 | Jeong et al. .................. | 359/10 |
| 2008/0253257 | A1 * | 10/2008 | Stallinga ..................... | 369/103 |

OTHER PUBLICATIONS

Ken Anderson, et. al., High Speed Holographic Data Storage at 100 Gbit/in2, Optical Society of America.

* cited by examiner

*Primary Examiner*—Daniell L Negrón
*Assistant Examiner*—Ifedayo Iluyomade
(74) *Attorney, Agent, or Firm*—Apex Jurvis, pllc; Tracy M Heims

(57) ABSTRACT

A holographic storage and regeneration system includes a holographic recording medium, a light source, a spatial light modulator, and a conjugate servo light guidance portion. The light source generates a signal light and a reference light. The spatial light modulator modulates the incident signal light and makes it incident onto the medium along the incident direction of the signal light. The guidance portion guides a reference light to incident onto the medium in one direction and reflects it in another direction. A reference light and a signal light interfere with each other to produce a holographic interference fringe. The reflected reference light is guided into a first image sensor to be used to analyze the incident angle of the reference light. When the reference light incidents onto the fringe of the medium through the guidance portion in a reverse direction relative to another direction, a conjugate regenerated light is generated.

23 Claims, 19 Drawing Sheets

HOLOGRAPHIC STORAGE AND REGENERATION SYSTEM HAVING SERVO MECHANISM

CROSS-REFERENCE TO RELATED APPLICATIONS

This non-provisional application claims priority under 35 U.S.C. §119(a) on Patent Application No(s). 096112743 filed in Taiwan, R.O.C. on Apr. 11, 2007, the entire contents of which are hereby incorporated by reference.

BACKGROUND

1. Field of Invention

The invention relates to a holographic storage and regeneration system and in particular to a holographic storage and regeneration system having servo mechanism.

2. Related Art

Presently, in the market of optical storage medium, since the capacity of the commercialized blue-light CD can hardly exceed the threshold of 100 Gbytes, thus various kinds of potential ultra-high capacity data recording technologies are under intensive research and development, and among them, the holographic CD is the most promising choice. The research and development of holographic recording technology has had a long history, however, due to various reasons, it still has not been utilized in the consumer optical storage products. Taking it for an example, holographic experiments conducted in the early days must be carried out by utilizing an enormously voluminous high power laser light source of several hundredths of milli-watts as well as a complicated optical system, and moreover, they must be used in cooperation with a heavy shock-proof table. Furthermore, the Photo-Refractive Crystal utilized as the holographic recording medium is even more expensive and beyond the comparison of the ordinary-priced medium. However, along with the rapid progress and development of this technology, the restrictions originally imposed on the holographic storage and recording technology have already solved and removed one-by-one. For example, the following systems and devices have made tremendous progress in their technologies, such as miniaturized high power laser, high photo-sensitive recording medium, and miniaturized data access optical system having position servo functions, such that the conventional thinking that the recording medium must be capable of being overwritten is changed due to the change of consumer habit in the compact disk (CD) market. However, up to the present time, it is still a very difficult task for the recording medium of Photo-Refractive Crystal capable of being written repeatedly to be able to satisfy the requirement of excellent material characteristics, high data stability and inexpensive price. In recent years, due to the popularity and widespread utilization of ordinary-priced write-only-once CD-R/DVD-R, thus the recognition that the holographic recording does not have to strive for the medium material capable of being overwritten repeatedly has gained widespread acceptance. If the functional requirement of overwriting repeatedly is not taken into consideration, then there are plenty of cheap organic material having high photo sensitivity, that can be chosen and utilized as data recording layer for the holographic CD, for example, a photo polymer is one of them. Under strong irradiation of recording light, the photopolymer may produce molecular chain like chemical reactions, thus the change of optical properties caused by the characteristics of sparsity and density of the molecular chains can be used to record and regenerate data related to 3-dimensional holographic interference fringes. The concept of the afore-mentioned miniaturized data access optical system having position servo functions is originated from the servo mechanism of CD/DVD player, and that is the keypoint in realization the implementation of holographic CDs.

With regard to the technology of holographic storage, such as that as disclosed in Joint International Symposium on Optical Memory and Optical Data Storage 2005 (ISOM/ODS 2005), Hawaii, US, paper ThE2, that is realized through a transmissive type holographic recording medium, and in this configuration, a two dimension image sensor and a Spatial Light Modulator are placed on the same side of a Holographic Storage Medium. And in executing data regeneration, a set of reflection mirrors placed on another side of the Holographic Storage Medium must be controlled mechanically, so that the reference light produced in regeneration is incident on Holographic Storage Medium along a direction opposite to that of the reference light utilized in a data recording process, as such for Holographic Storage Medium in continuous motion, the position and direction of the set of reflective mirrors can not be corrected swiftly in a real-time manner.

In addition, another related prior art is disclosed in U.S. Pat. Gazette Publication No. 6,721,076 and U.S. Pat. No. 6,909,529, wherein, an optical framework used for reflective type holographic recording medium is disclosed in detail. However, for a displacement multiplex continuously moving Holographic Storage Medium, a concrete servo mechanism is lacking.

Moreover, in another USP 20040212859, a reflective and transmissive Holographic Storage approach is disclosed. Wherein, a servo light is incident onto a servo track of a Holographic Storage Medium through an object lens in an optical path, thus a servo mechanism of displacement multiplexing is utilized. However, its shortcomings are that, when performing angle multiplexing, the function of angular servo mechanism is lacking.

SUMMARY OF THE INVENTION

In view of the above-mentioned problems and drawbacks of the prior art, the invention provides a holographic storage and regeneration system capable of focusing, path finding, and angle servo, thus providing a servo mechanism, developing and providing a corresponding optical framework in facilitating a speedy and convenient data access and storage, achieving angular multiplexing and producing regenerated lights having conjugated phases, hereby reducing the image distortion incurred during its regeneration. In addition, the optical framework of the invention can be used to reduce the overall volume and the space occupied by the entire holographic storage and regeneration system.

Therefore, to achieve the above-mentioned objectives, the invention provides a holographic storage and regeneration system, including: a holographic recording medium, a light source, a Spatial Light Modulator (SLM), and a conjugate light guidance portion. Wherein, the light source is used to generate a signal light and a reference light; the spatial light modulator, located on an optical path of signal light, thus the signal light incident upon the spatial light modulator is modulated by it, then the signal light will incident upon a holographic recording medium along its incident direction; and a conjugate light guidance portion, that is used to make the reference light incident upon the holographic recording medium along a specific direction, and hereby reflected by it to proceed in another direction. In this process, the reference light and signal light interfere with each other, thus producing a holographic interference fringe in the holographic recording medium, and then the reflected reference light is guided into a first image sensor through the conjugate light guidance portion, where it is analyzed and is used to adjust the incident angle of the reference light. Wherein, when the reference light is again incident onto the holographic recording medium through a conjugate light guidance portion in a reverse direction relative to said another direction, it is reflected by the holographic recording medium, so that the reference light is reflected in a reverse direction of the original direction, and when the reference light is incident again upon the holographic interference fringe, a conjugate regenerated light is produced, and is incident upon a second image sensor along a reverse direction relative to the incident direction of the signal light.

The benefit of the holographic storage and regeneration system of the invention is a rapid and efficient data storage and retrieval when it is utilized in cooperation with a servo mechanism. In addition, the invention can be utilized to realize angle multiplexing in producing regenerated lights having conjugated phases, thus achieving the reduction of image distortion incurred during data regeneration. Moreover, the optical framework of the invention can be used to further raise the data storage capacity of the holographic storage medium by means of a holographic multiplex mechanism. Furthermore, the holographic storage and regeneration system and method of the invention can be utilized to realize a servo mechanism having a plurality of multiplex mechanisms through a compact construction, thus reducing its volume and be compatible with the conventional recording medium such as CD or DVD.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus are not limitative of the invention, and wherein.

DETAILED DESCRIPTION OF THE INVENTION

The purpose, construction, features, and functions of the invention can be appreciated and understood more thoroughly through the following detailed description with reference to the attached drawings.

In the following, the preferred embodiments of the invention will be described in detail together with the attached drawings.

Figure 1A:
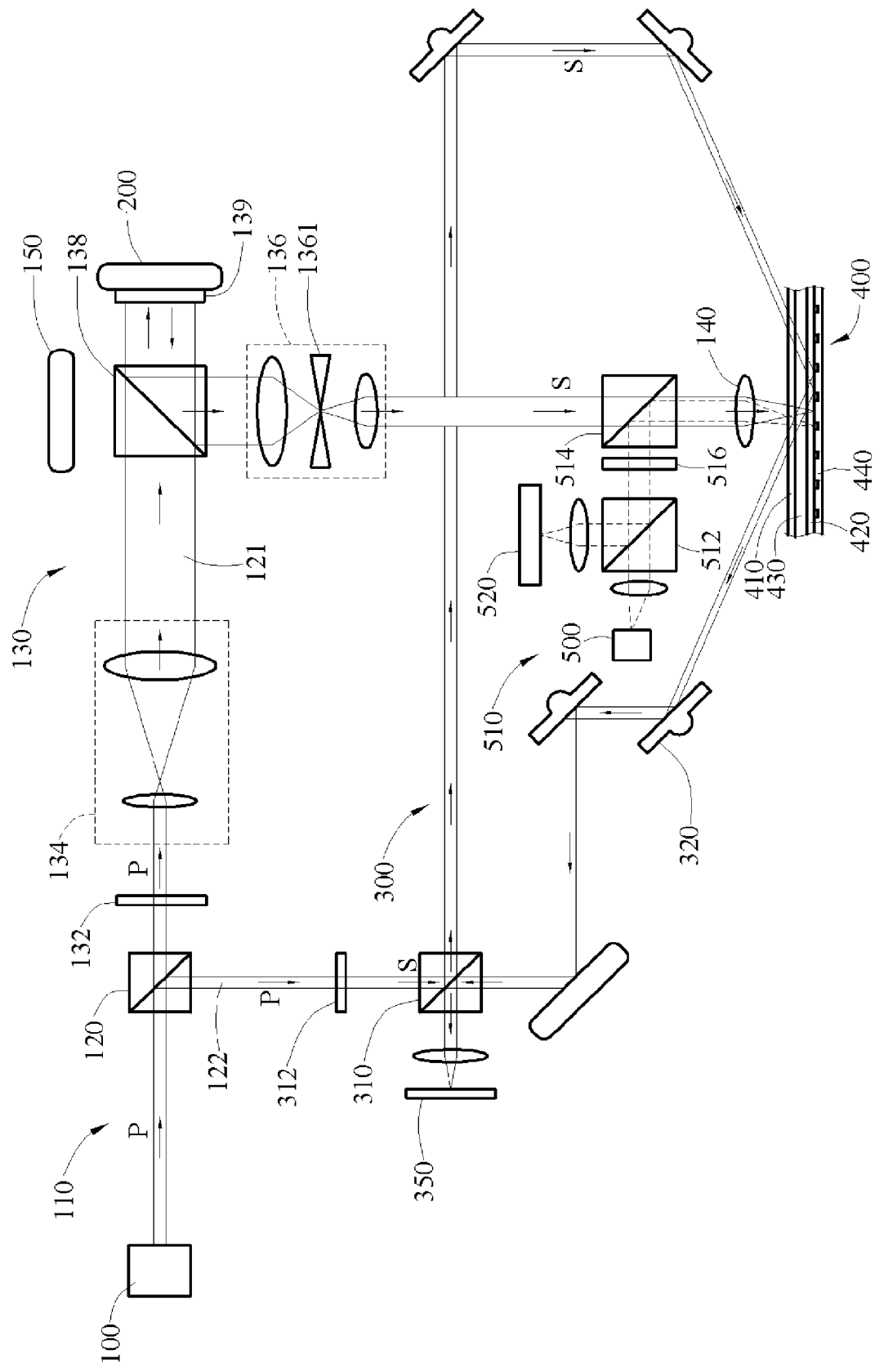
FIGS. 1A & 1B are the schematic diagrams of a holographic storage and regeneration system having servo mechanism according to a first embodiment of the invention.
Figure 1B:
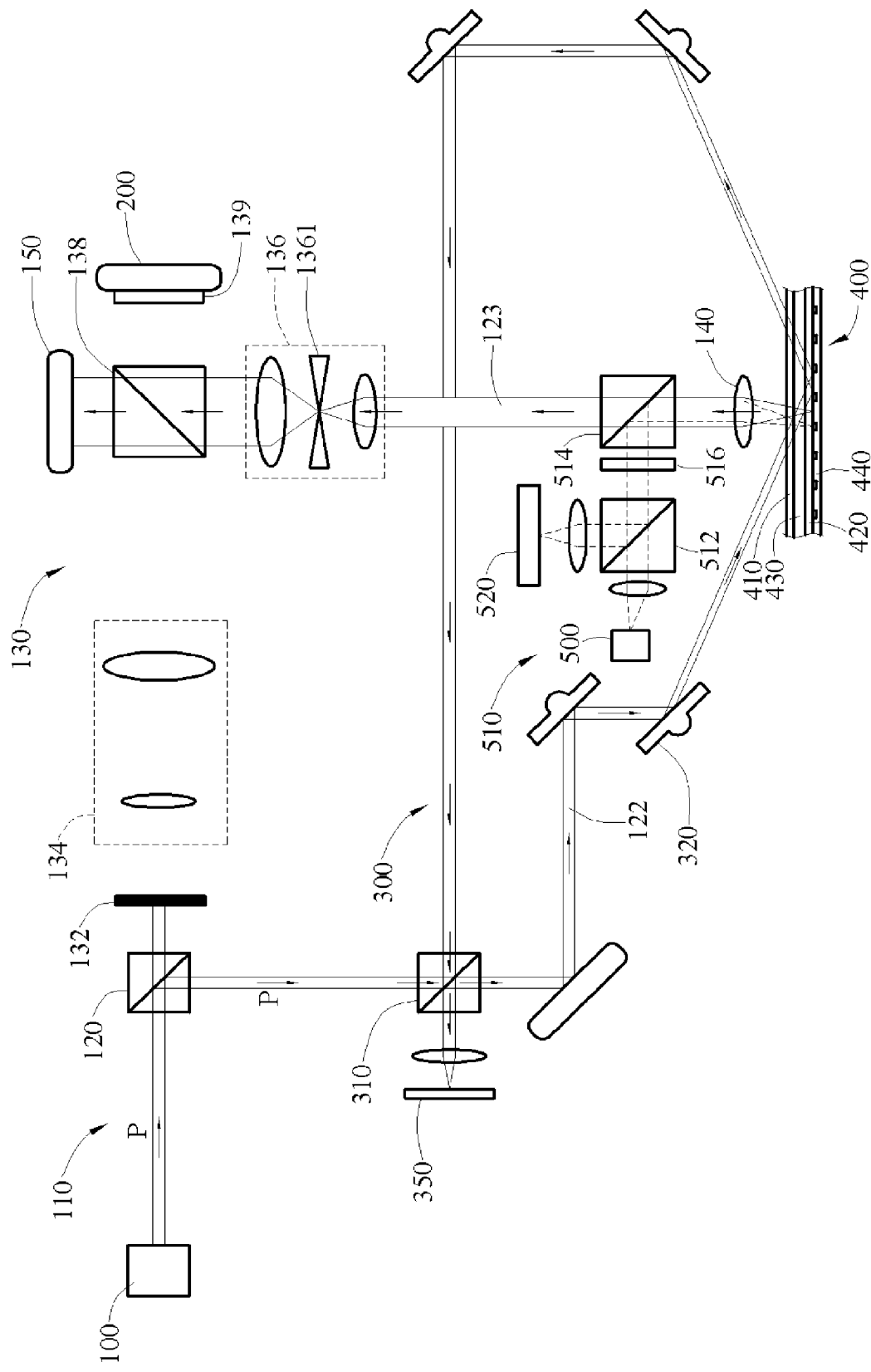

Firstly, refer to FIGS. 1A and 1B respectively for schematic diagrams of a holographic storage and regeneration system having servo mechanism according to a first embodiment of the invention. As shown in FIGS. 1A and 1B, holographic storage and regeneration system having servo mechanism according to a first embodiment of the invention includes a holographic storage medium 400, a light source 100, a spatial light modulator 200, a first light guidance portion 110, a second light guidance portion 130, a conjugate light guidance portion 300, a servo light guidance portion 510, and a servo light source 500.

Figure 1C:
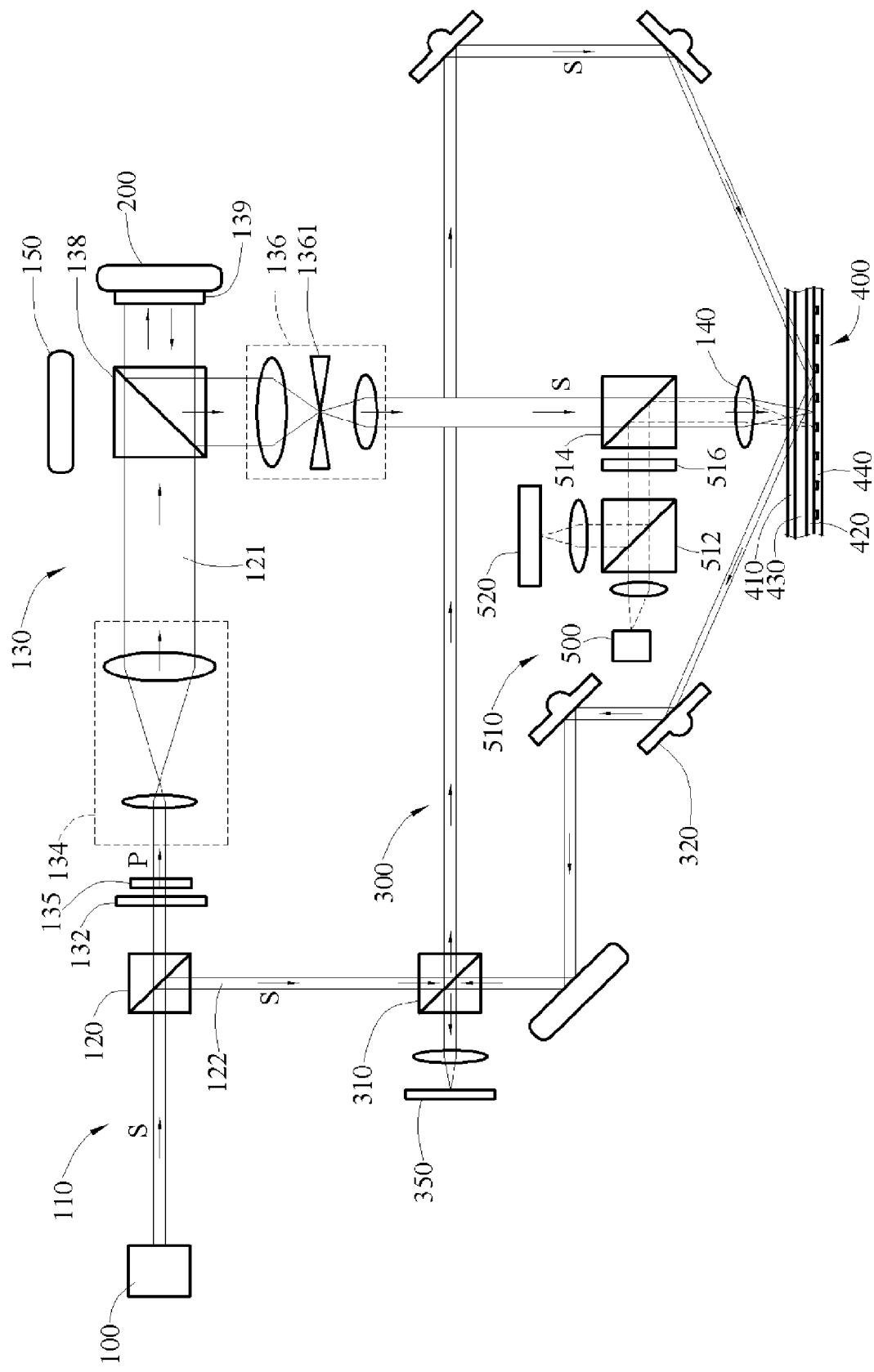
FIGS. 1C & 1D are the schematic diagrams of a holographic storage and regeneration system having servo mechanism according to a second embodiment of the invention.
Figure 1D:
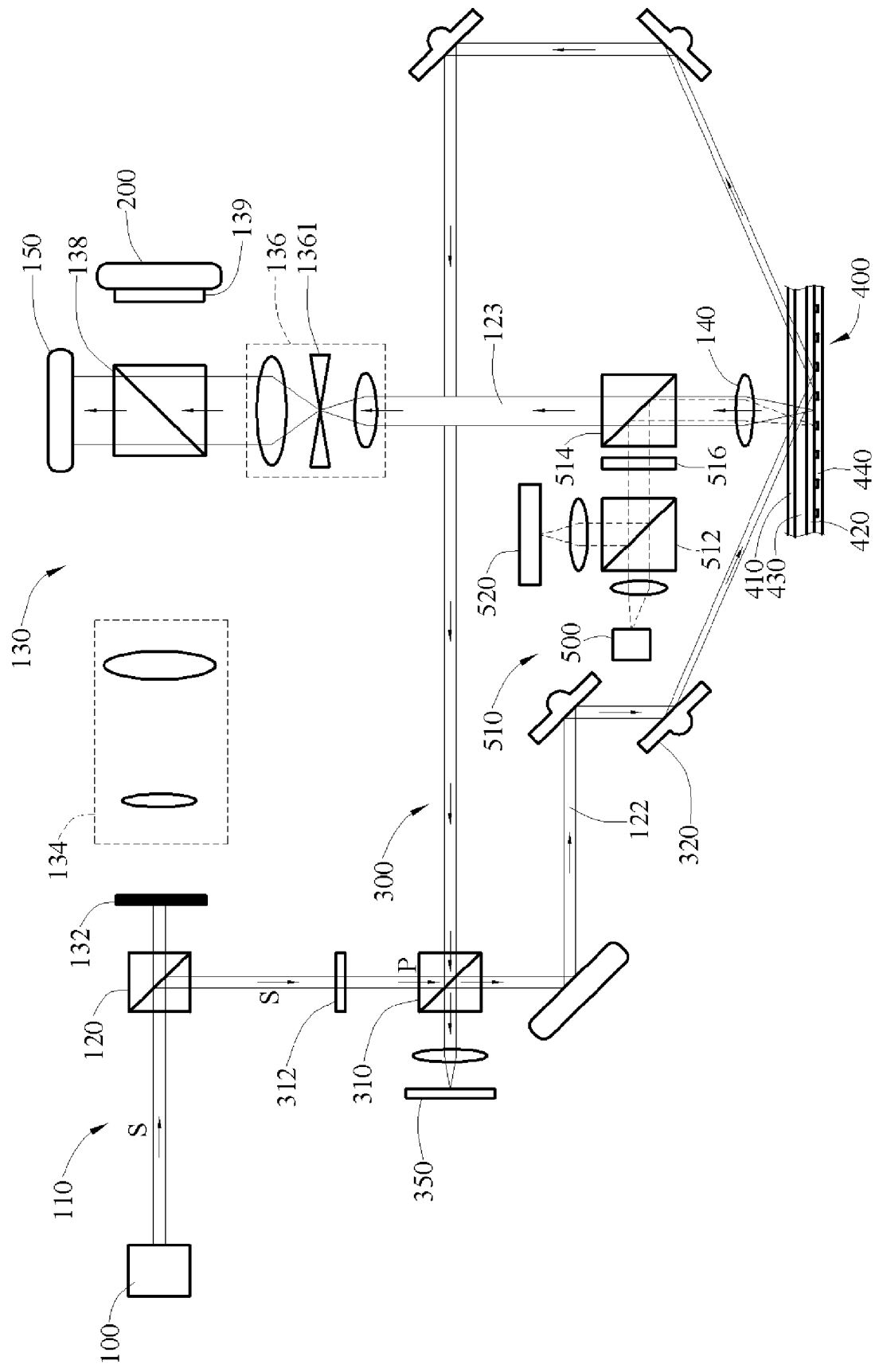
Figure 1E:
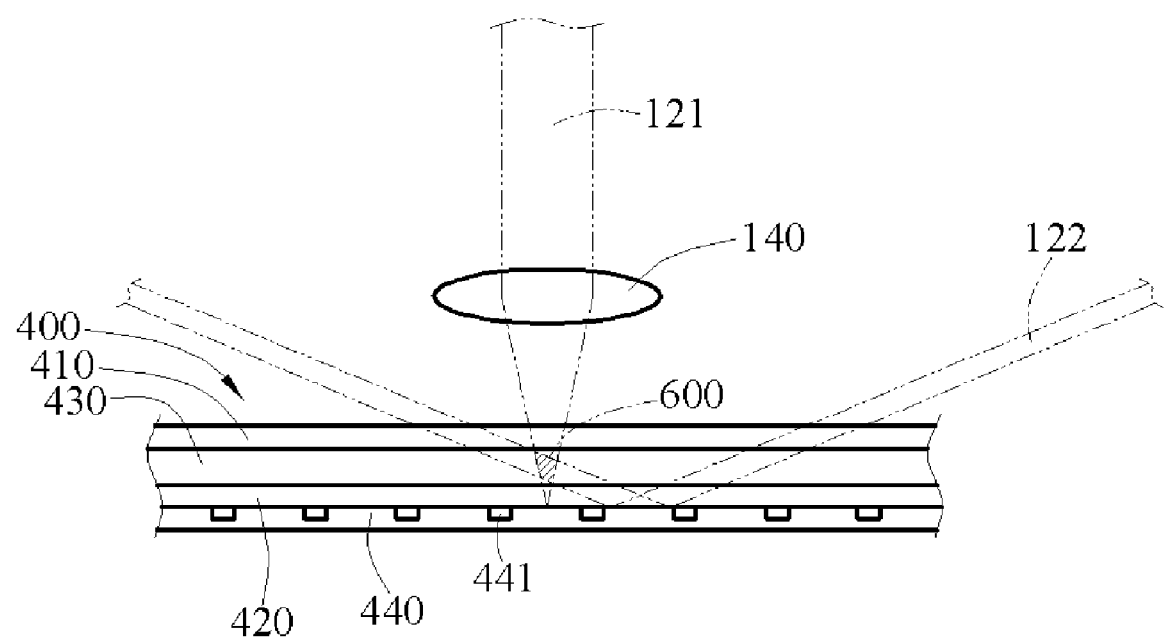
FIG. 1E is a cross section view of a holographic recording medium of the invention.

Next, refer to FIG. 1E. As shown in FIG. 1E, the holographic interference fringes 600 can be stored in holographic storage medium 400. The holographic storage medium 400 includes a first substrate 410, a second substrate 420, a recording layer 430, and a reflection layer 440. Wherein, the recording layer 430 is formed between a first substrate 410 and a second substrate 420, and the recording layer 430 can be used to store and record the incident light signals, such as the holographic interference fringes 600 etc. The reflection layer 440 is a multi-layer coated film forming on the bottom of a second substrate 420. Wherein, the reflection layer 440 allows the perpendicularly incident light to transmit, while making the light incident at an oblique angle in a specific range to achieve total reflection. In addition, the reflection layer 440 is used to reflect the displacement servo light used for focusing and track finding, and a servo track 441 is formed in the reflection layer 440, that is composed of a plurality of recess holes and/or protrusion pieces, or it is an ordinary servo track in the conventional CD/DVD disks, thus when light beam incident on servo track 441, it will be modulated by the servo track 441. As such, upon reflection of a servo light by a servo track 441, it is known that the data is located at a specific position of the holographic storage medium 400, thus achieving the function of finding a data track.

Referring back to FIG. 1A, for a description of the operation of the light is emitting from a light source to a holographic storage medium. As shown in FIG. 1A, a linearly polarized light having polarized state is emitted from a light source 100. In general, a laser light source is used to provide the linearly polarized light required. In the embodiment of the invention, a laser light emitter having emitted light wavelength of 407 nm is utilized as light source 100. In a first embodiment of the invention a linearly polarized light of the first polarized state is used to incident. When this linearly polarized light passes through a light splitter 120 of the first light guidance portion 110, it is splitted into a reference light 122 and a signal light 121. Wherein, the signal light 121 passing through light splitter 120 still remains as a linearly polarized light of the first polarization state, while the reference light 122 reflected by the light splitter 120 also remains as a linearly polarized light having the first polarization state. In the embodiment of the invention, the first polarized state is a P polarization state.

Subsequently, the signal light 121 is guided into a second light guidance portion 130, which is composed of a light shielding plate 132, a first set of lenses 134, a second set of lenses 136, a second polarizing light splitter 138, a ¼λ-wave plate 139, and an object lens 140. Wherein, the light shielding plate 132 is disposed between a light splitter 120 and a first set of lenses 134. When performing data storage of a holographic storage and regeneration system, the light shielding plate 132 is used to transmit the signal light 120 passing through light splitter 120, and this signal light then incidents upon holographic storage medium 400 through a second light guidance portion 130.

The first set of lenses 134 includes a set of lenses used to expand the light beam of signal light 121, and that is composed of a plurality of lenses.

The second polarized light splitter 138 is provided behind a first set of lenses 134, and is used to receive the signal light 121 expanded through first set of lenses 134. Since the signal light 121 passing through first set of lenses 134 is a linearly polarized light having P polarization state, thus, when signal light 121 incidents upon a second polarized light splitter 138, it may pass through the second polarized light splitter 138 unaffected, and incident upon a spatial light modulator 200 at one side of the second polarized light splitter 138.

In addition, in this embodiment, a first ¼λ-wave plate 139 is disposed between the second polarizing light splitter 138 and a spatial light modulator 200. Wherein, the first ¼λ-wave plate 139 is used to change the polarization state of the signal light 121. Upon incidenting upon the first ¼λ-wave plate 139, the signal light 121 having P polarization state passing through second polarized light splitter 138 is changed to signal light 121 having circular polarization state, and then it incidents upon spatial light modulator 200.

In the above description, the spatial light modulator 200 utilized in the embodiment is reflective type spatial light modulator 200, such as Digital Micro-Mirror Device (DMD). When signal light 121 is incident upon spatial light modulator 200, it will be modulated by spatial light modulator 200. Before incidenting upon spatial light modulator 200, signal light 121 first passes through a first ¼λ-wave plate 139. At this time, signal light 121 is in a circular polarization state. Then, upon incidenting on spatial light modulator 200, it will be reflected back and passes through the first ¼λ-wave plate 139 again. At this time, the modulated signal light 121 is converted into S polarization state and passes through second polarized light splitter 138 again and will be reflected by it and change its direction, so the signal light 121 thus produced will incident upon holographic storage medium 400 along the incident direction of the signal light. In the embodiment, the signal light incident direction is defined as the first direction, and the above-mentioned signal light incident direction is the direction that the incident light incident perpendicularly onto holographic storage medium 400.

Wherein, the modulated signal light 121 first incidents upon a second set of lenses 136, which includes a plurality of lenses and a spatial filter element 1361. The plurality of lenses are used to converge signal light 121, while spatial filter element 1361 is disposed between the plurality of lenses. As such, spatial filter element 1361 allows only the passing through of signal light 121 and conjugate regenerated light 123, while filtering out other miscellaneous lights except signal light 121 and conjugate regenerated light 123.

Then, the converged signal light 121 incidents and passes through object lens 140, thus signal light 121 is converged and incidents upon holographic storage medium 400.

Furthermore, refer again to FIG. 1A, wherein, reference light 122 having P polarization is reflected by a first light splitter 120 and changes its direction, hereby incidenting upon conjugate light guidance portion 300, and that is used to guide the reference light 122 to incident upon holographic storage medium 400 along a specific direction, then, the reference light 122 reflected by holographic storage medium 400 into another direction, and is guided by a conjugate light guidance portion 300 to incident upon a first image sensor 350 through the convergence of a lens. In this embodiment, the direction of reference light 122 incidenting onto holographic storage medium 400 is defined as a second direction, wherein, an acute angle is formed between an extension line in a second direction and the surface of holographic storage medium 400, thus the second direction is the direction that light incidents upon holographic storage medium 400 along this acute angle. For example, as shown in FIG. 1A, light incidents upon holographic storage medium 400 from the upper right side. In this embodiment, the direction of the reference light 122 reflecting from holographic storage medium 400 is defined as a third direction. Wherein, the third direction is symmetric to the second direction based on the first direction as a symmetric axis. Therefore, an identical angle is formed between an extension line in the third direction and a surface of holographic storage medium (in conformity with the law of reflection). Therefore, in this embodiment, as shown in FIG. 1A, the second direction is a direction that the reference light 122 incidenting obliquely upon holographic storage medium 400, while the third direction is a direction of reference light 122 proceeding at an acute angle leading away from holographic storage medium 400.

The conjugate light guidance portion 300 includes a second ½λ-wave plate 312, a second polarizing light splitter 310, and a plurality sets of rotatable reflection mirrors 320.

In a first embodiment of the invention, a second ½λ-wave plate 312 is movably disposed between light splitter 120 and a second polarizing light splitter 310. In executing the data storage of the holographic storage and regeneration system, the second ½λ-wave plate 312 is selectively disposed between light splitter 120 and second polarizing light splitter 310, and also on the optical path of reference light 122, so that reference light 122 having P polarization as reflected by light splitter 120 and changing its direction, is converted into reference light 122 having S polarization, and then incidents upon second polarizing light splitter 310. Since reference light 122 is in S polarization state, thus it is reflected by a second polarizing light splitter 310 and changes its direction, and then incidents upon a set of rotatable reflection mirrors 320, and finally is guided into incidenting upon holographic storage medium 400 in a second direction.

Figure 2A:
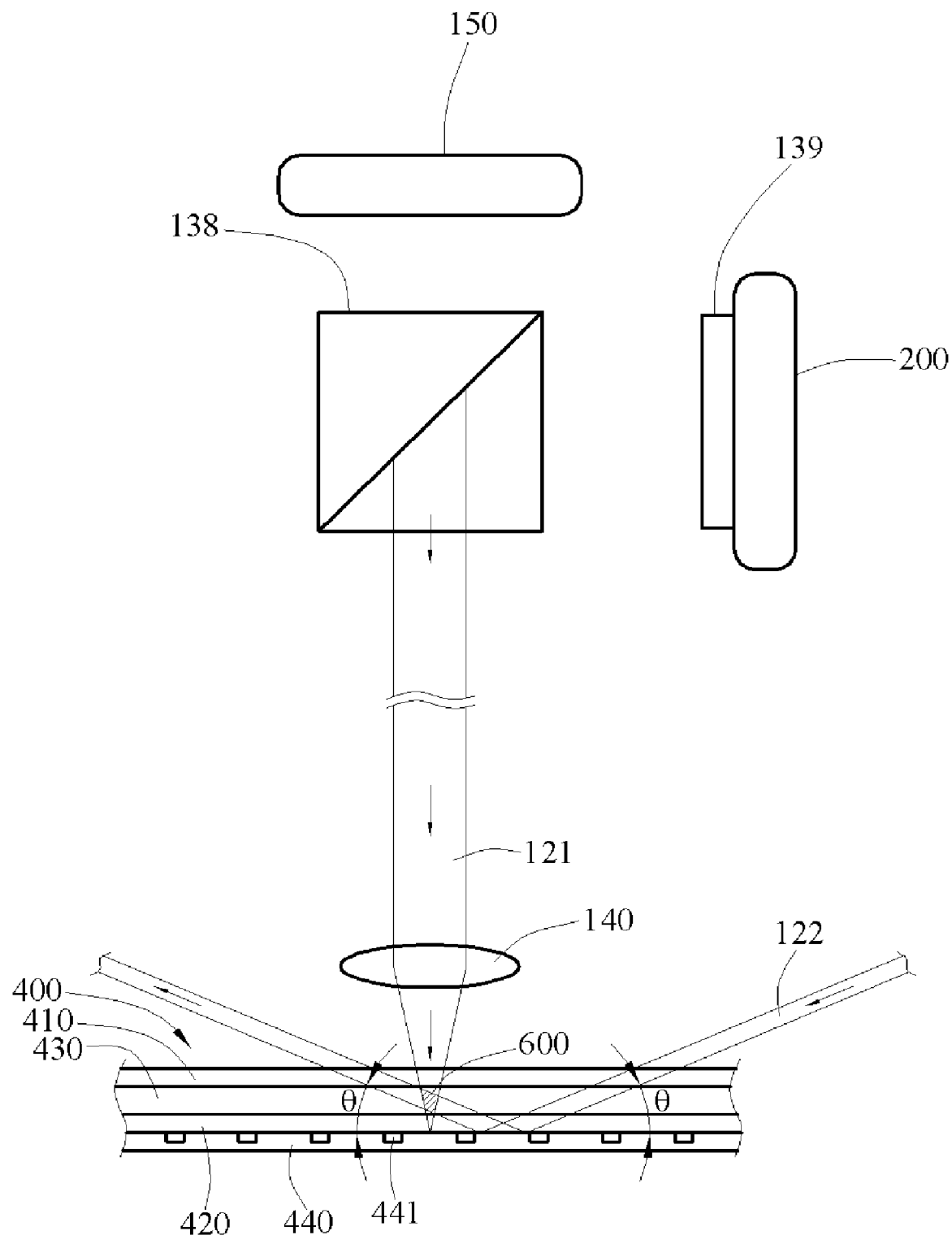
FIG. 2A is a partial enlarged view of a holographic storage and regeneration system having servo mechanism in performing data storage according to a first embodiment of the invention.

Subsequently, refer to FIG. 2A for an enlarged view of a portion of a holographic storage and regeneration system having servo mechanism in executing data storage according to a first embodiment of the invention. As shown in FIG. 1A, upon incidenting on holographic storage medium 400, reference light 122 will first be reflected by a reflection layer 440 of holographic storage medium 400 into total reflection, namely, reference light is emitted in a third direction, wherein, an acute angle θ is formed between the third direction of the reflected reference light 122 and a surface of reflection layer 440. When reference light 122 is reflected from reflection layer 440 onto a recording layer 430, and due to the fact that reference light 122 is in S polarization state and signal light 121 is also in S polarization state, thus the reference light 122 and signal light 121 having the same polarization state will interfere each other, thus producing holographic interference fringe 600 and recording it onto the recording layer 430 of holographic storage medium 400. In this embodiment, the reflection layer 440 is a multi-layer coated film formed on the bottom side of a second substrate 420 As such, when reference light 122 and signal light 121 incident upon holographic storage medium 400, reference light 122 is reflected by reflection layer 440 into total reflection, while signal light 121 may transmit through holographic storage medium 400.

Moreover, as shown in FIG. 1A, the reference light 122 totally reflected by holographic storage medium 400 may incident again onto the set of rotatable reflection mirrors 320, thus being guided to incident again on a second polarized light splitter 310. Then, the reference light 122 having S polarization is reflected by a second polarizing light splitter 310, thus changing its direction and incidenting into a first image sensor 350 through a lens, and that is used to analyze the angle with which reference light 122 incidenting onto holographic storage medium 400, and the angle with which it is reflected by holographic storage medium.

Figure 2B:
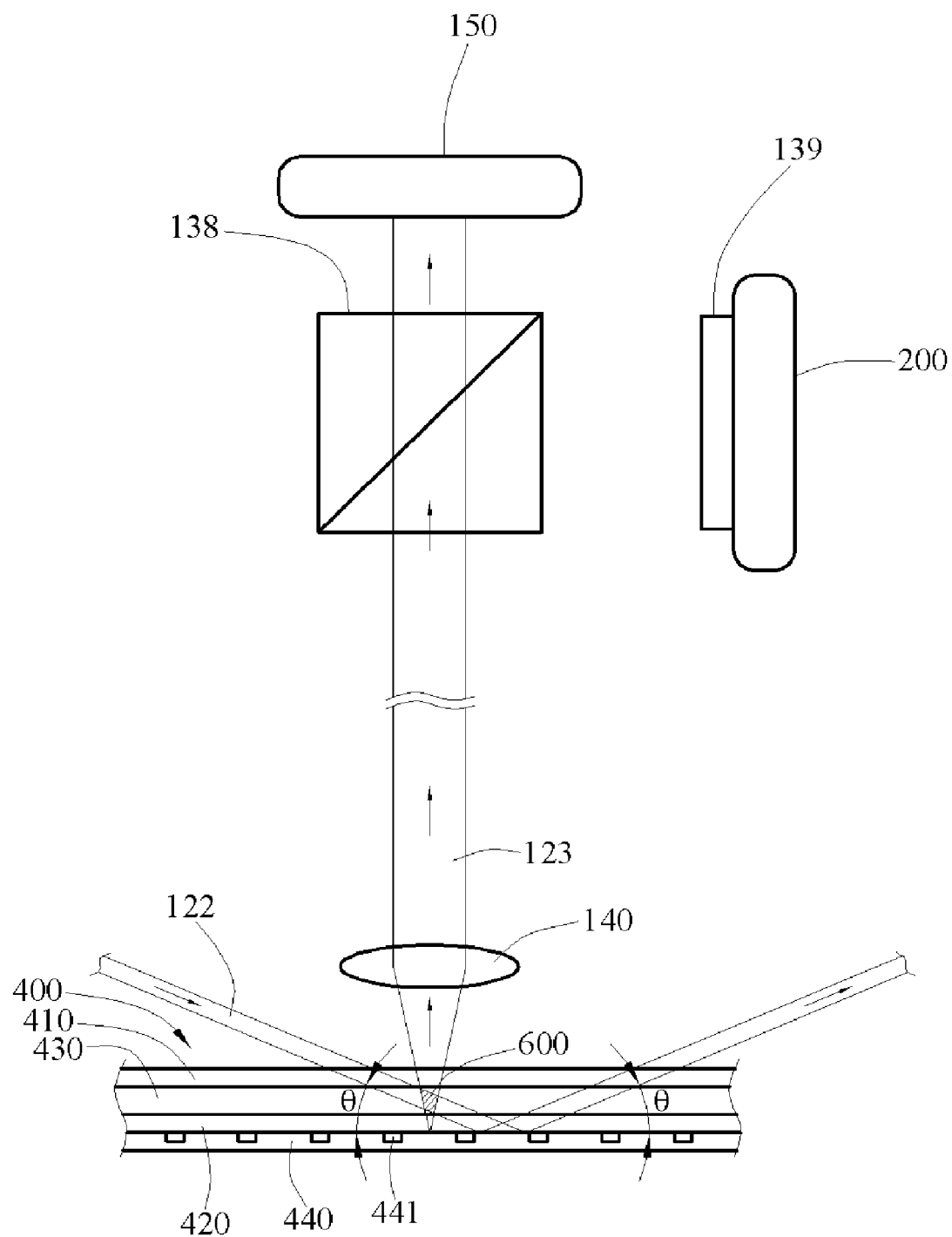
FIG. 2B is a partial enlarged view of a holographic storage and regeneration system having servo mechanism in performing data regeneration according to a first embodiment of the invention.

Subsequently, refer to FIG. 1B. As shown in FIG. 1B, in implementing the data regeneration of holographic storage and regeneration system according to a first embodiment of the invention, the signal light 121 intended to be guided into second light guidance portion 130 is shielded by a light shielding plate 132, thus not being able to incident onto holographic storage medium 400. Meanwhile, a movable second ½λ-wave plate 312 is removed from the optical path of reference light 122, then the reference light 122 having P polarization as reflected by light splitter 120 is incident directly onto a second polarizing light splitter 310. Thus, reference light 122 may pass through a second polarizing light splitter 310, and then incident onto holographic storage medium 400 in a reverse direction relative to the third direction through the set of rotatable reflection mirrors 320. Subsequently, refer to FIG. 2B for an enlarged view of a portion of a holographic storage and regeneration system having servo mechanism in data regeneration according to a first embodiment of the invention. As shown in FIG. 2B, reference light 122 can be reflected by a reflection layer 440 of holographic storage medium 400 into total reflection, and incident onto the set of rotatable reflection mirrors 320 in a reverse direction relative to the second direction, and then it is guided into incidenting again onto and passing through a second polarized light splitter 310, and then incidenting onto a first image sensor 350 through a lens, and that is used to analyze and adjust the angle with which reference light 122 incidenting onto holographic storage medium 400, and the angle with which it is reflected by holographic storage medium during data regeneration. In data regeneration, reference light 122 accurately incident onto holographic storage medium 400 through a conjugate light guidance portion 300 in a reverse direction relative to the third direction, at this time, an acute angle θ is formed between reference light 122 and a surface of a reflection layer 440. Thus, when reference light 122 incidents again onto a holographic interference fringe 600 stored in a recording layer 430, a conjugate regenerated light 123 will be produced. Since at this time, reference light is in a P polarization state, therefore the conjugate regenerated light 123 thus produced is also in a P polarization state, as such, the conjugate regenerated light 123 will incident onto a second image sensor 150 in a reverse direction relative to the first direction. Wherein, the second image sensor 150 is placed on one side of a second polarizing light splitter 138 adjacent to a spatial light modulator 200, and is used to read the conjugate regenerated light 123 that reconstructed from a holographic interference fringe 600.

Furthermore, refer to FIG. 1C for a holographic storage and regeneration system having servo mechanism according to a second embodiment of the invention. Wherein, the basic system framework and operation principle are similar for the first embodiment and the second embodiment. The major difference between the two is that, in the second embodiment of the invention, in executing data storage, a linearly polarized light of second polarization state is utilized to incident into the system. When the linearly polarized light passes through light splitter 120 of a first light guidance portion 110, it will similarly be splitted into a reference light 122 and a signal light 121. Wherein, the signal light 121 passing through light splitter 120 still is a linearly polarized light of a second linear polarization state, while the reference light 122 reflected by light splitter 120 is also a linearly polarized light of a second linear polarization state. In this embodiment, the second linear polarization state is an S polarization state.

Then, signal light 121 is guided into a second light guidance portion 130, and a first ½λ-wave plate 135 is disposed between a light shielding plate 132 and a first set of lenses 134. As such, in performing data storage of the holographic storage and regeneration system, the signal light 121 having S polarization is converted into a signal light 121 having P polarization through passing a first ½λ-wave plate 135, and then incidents onto holographic storage medium 400 through a first light guidance portion 130.

In addition, the reference light 122 having S polarization is reflected and changed direction by light splitter 122, and incidents onto a conjugate light guidance portion 300. As in the first embodiment, reference light 122 incidents onto holographic storage medium 400 along a second direction, such that the reference light 122 is reflected by holographic storage medium 400 in a third direction, and is guided by a conjugate light guidance portion 300 to incident onto a first image sensor 350 through the convergence of a lens.

Subsequently, refer to FIG. 1D. As shown in FIG. 1D, in implementing the data regeneration of holographic storage and regeneration system according to a second embodiment of the invention, the signal light 121 intended to be guided into second light guidance portion 130 is shielded by a light shielding plate 132, thus not being able to incident onto holographic storage medium 400. Meanwhile, a movable second ½λ-wave plate 312 is selectively disposed between a light splitter 120 and a second polarizing light splitter 310 and is also located on the optical path of reference light 122. After passing through a second ½λ-wave plate 312, the reference light 122 having S polarization is converted into the reference light 122 having P polarization. Thus, reference light 122 may pass through second polarizing light splitter 310 unaffected, and then incidents onto holographic storage medium 400 through the set of rotatable reflection mirrors 320 in a reverse direction relative to a third direction.

Moreover, the holographic storage and regeneration system of the invention is provided with a feedback mechanism, and is realized through a servo light source 500 and a servo light guidance portion 510. The servo light source 500 is used to generate a servo light 501, with its wavelength different from those of signal light 121 and reference light 122. The servo light guidance portion 510 is used to guide servo light 501 into incidenting onto a servo track 441 of holographic storage medium 400. The servo light guidance portion 510 is used to guide the servo light 501 reflected by servo track 441 into a servo light sensor 520, thus being able to know the position of holographic interference fringe 600 in holographic storage medium 400, control and adjust holographic interference fringes 600 and record it in a recording layer 430 of holographic storage medium 400 sequentially along a servo track 441, hereby raising the data storage capacity of holographic storage medium 400.

Figure 2C:
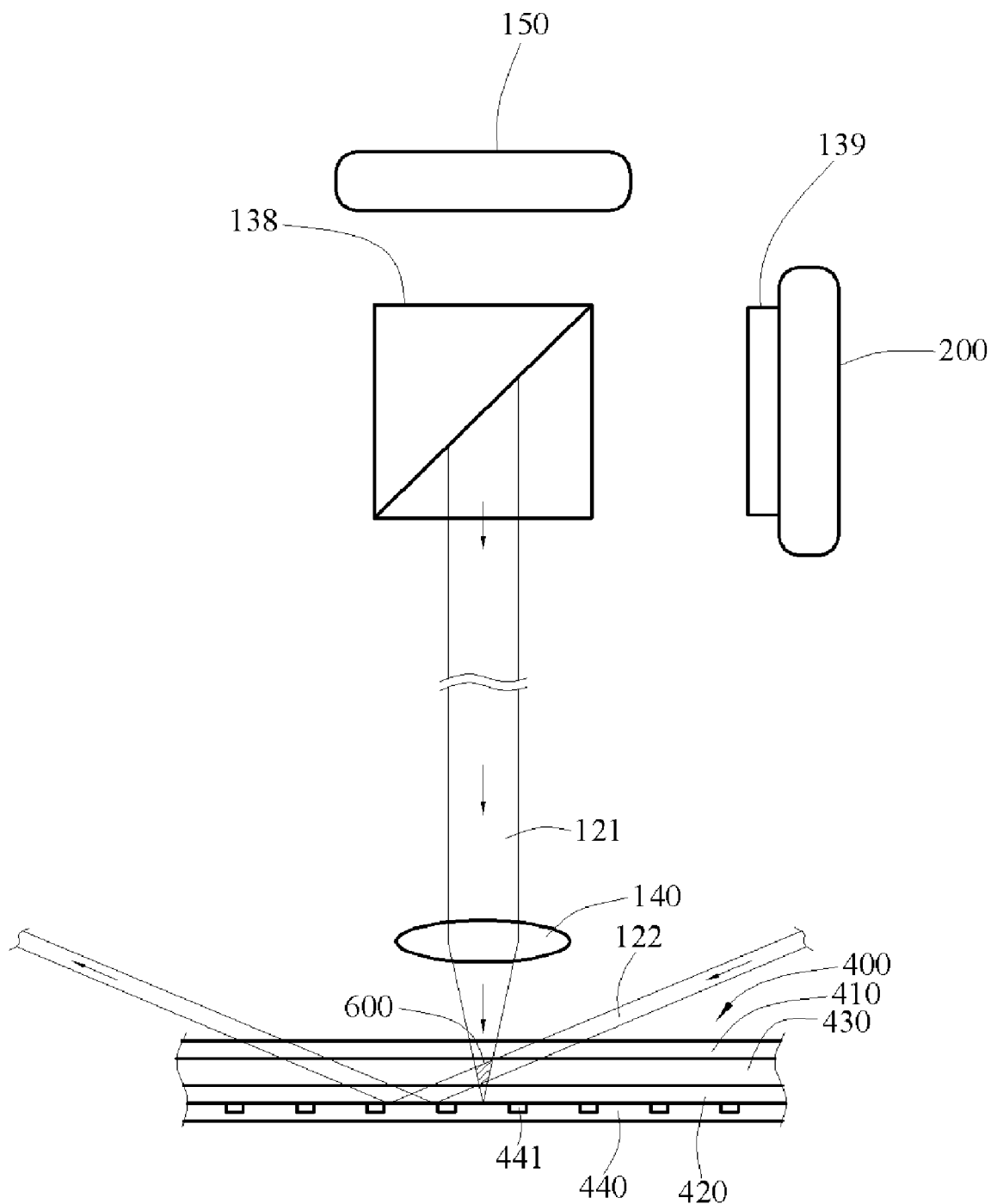
FIG. 2C is a partial enlarged view of a holographic storage and regeneration system having servo mechanism in performing data storage according to a third embodiment of the invention.
Figure 2D:
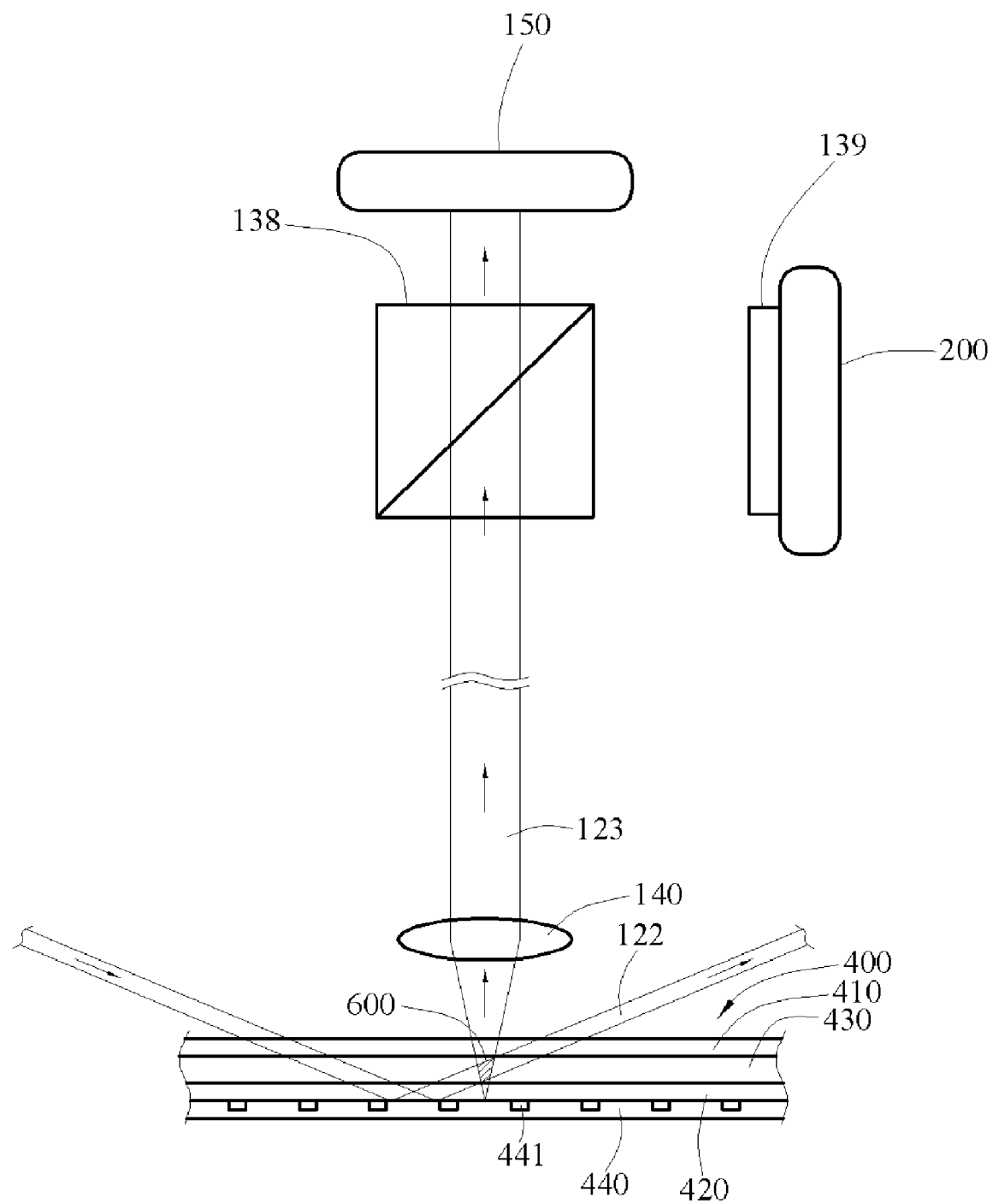
FIG. 2D is a partial enlarged view of a holographic storage and regeneration system having servo mechanism in performing data regeneration according to a third embodiment of the invention.

Furthermore, it must be emphasized here that, the application of the invention is not in any way restricted to the aforementioned real embodiments. Refer to FIGS. 2C and 2D for an enlarged partial portion view of holographic storage and regeneration system according to a third embodiment of the invention in implementing data storage. Wherein, in the third embodiment, in performing data storage of the holographic storage and regeneration system, reference light 122 is used to incident onto holographic storage medium 400. Firstly, reference light 122 will incident onto a recording layer 430 of holographic storage medium 400 along a second direction, and interfere with a signal light having the same polarization, hereby producing holographic interference fringe 600. Then, reference light 122 is reflected from a reflection layer 440 and exits in a third direction. In carrying out the data regeneration of the holographic storage and regeneration system, the above-mentioned steps are executed on the above optical path in a reverse direction.

Figure 3A:
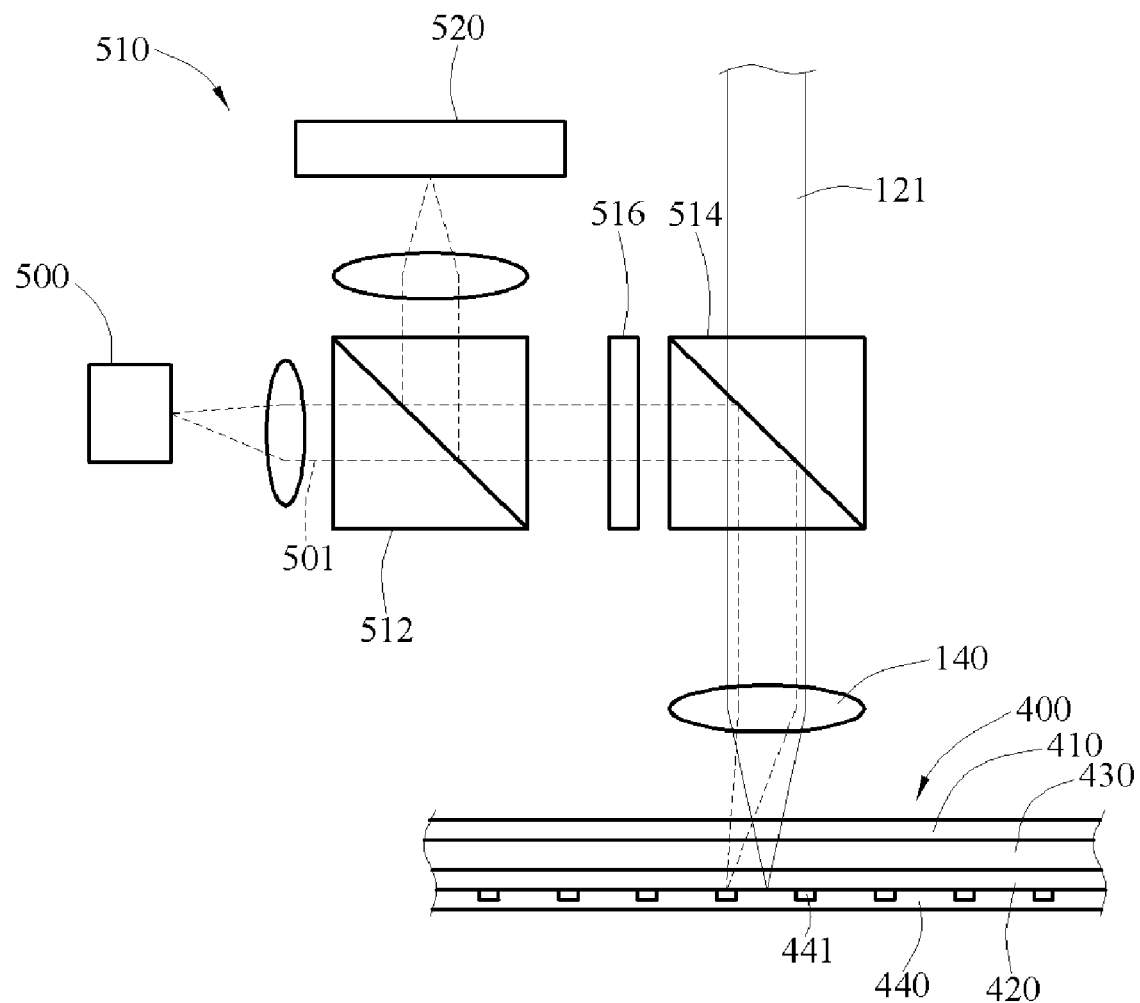
FIG. 3A is a schematic diagram of a servo light optical path of the invention.
Figure 3B:
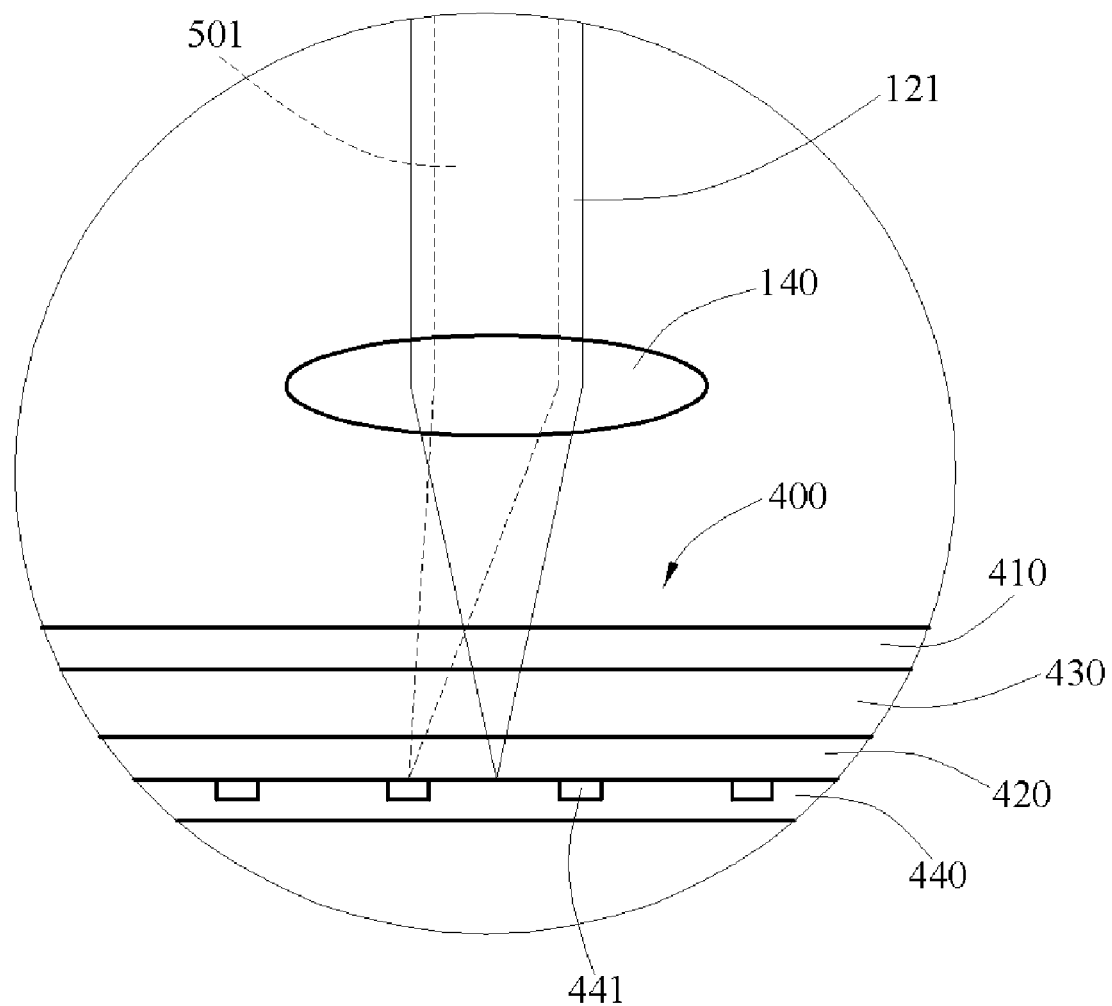
FIG. 3B is an enlarged view of a servo light optical path of the invention.

Refer to FIGS. 3A & 3B respectively for a schematic diagram and partial portion enlarged view of servo optical path of the invention. The servo light guidance portion 510 includes a fourth polarizing light splitter 512, a second ¼λ-wave plate 516, and a Dichroic Prism 514. Wherein, fourth polarizing light splitter 512 is placed on an optical path of servo light 501. Upon passing through a fourth polarizing light splitter 512, servo light 501 is converted into a servo light 501 having P polarization, and incidents onto a second ¼λ-wave plate 516, so that servo light 501 is converted into a servo light having left turn circular polarization, and incidents again onto Dichroic Prism 514.

The Dichroic Prism 514 is disposed on the intersection of an optical path of signal light 121 and that of servo light 501, and is used to separate lights of different wavelengths. Therefore, when signal light 121 incidents upon object lens 140 from a second set of lenses 136, it will pass through Dichroic Prism 514 unaffected. However, when servo light 501 incidents upon Dichroic Prism 514, it can not transmit through it and will be totally reflected, thus changing direction and incidenting onto a servo track 441 of holographic storage medium 400. Subsequently, upon modulated by a reflection layer 440 of a servo track 441, the servo light 501 is reflected and exits holographic storage medium 400 and incidents again onto Dichroic Prism 514. Similarly, the reflected servo light 501 is totally reflected by Dichroic Prism and changes its direction. At this time, the servo light 501 having right turn circular polarization passes through a second ¼λ-wave plate 516 with its polarization changed into S polarization, and incidents again onto a forth polarizing light splitter 512. And this servo light 501 having S polarization is reflected by the forth polarizing light splitter 512, hereby changing its direction and incidents onto a servo light sensor 520, and that is utilized to detect the servo light 501 modulated by a servo track 441, and convert it into an electrical signal and transmit it to a control device. As such, the control device can be used to move the optical framework or holographic storage medium 400, so that holographic interference fringe 600 may be recorded in a recording layer 430 of holographic storage medium 400 along a servo track 441 as shown in FIG. 3B.

In addition, in order to prevent servo light signal from being affected by signal light 121, the servo light source 500 is disposed laterally away from the optical axis a certain distance, as such servo track 441 is offset from the focal point of signal light 121 a slight distance. Thus, the servo light signal focuses on a servo track 441 and reflects subject to the modulation of servo track 441, as shown in FIG. 3B. However, the servo optical path of the invention is not restricted to the above-mentioned implementation manner, it can be combined with the track finding servo optical path of CD/DVD in an arbitrary manner.

Figure 4A:
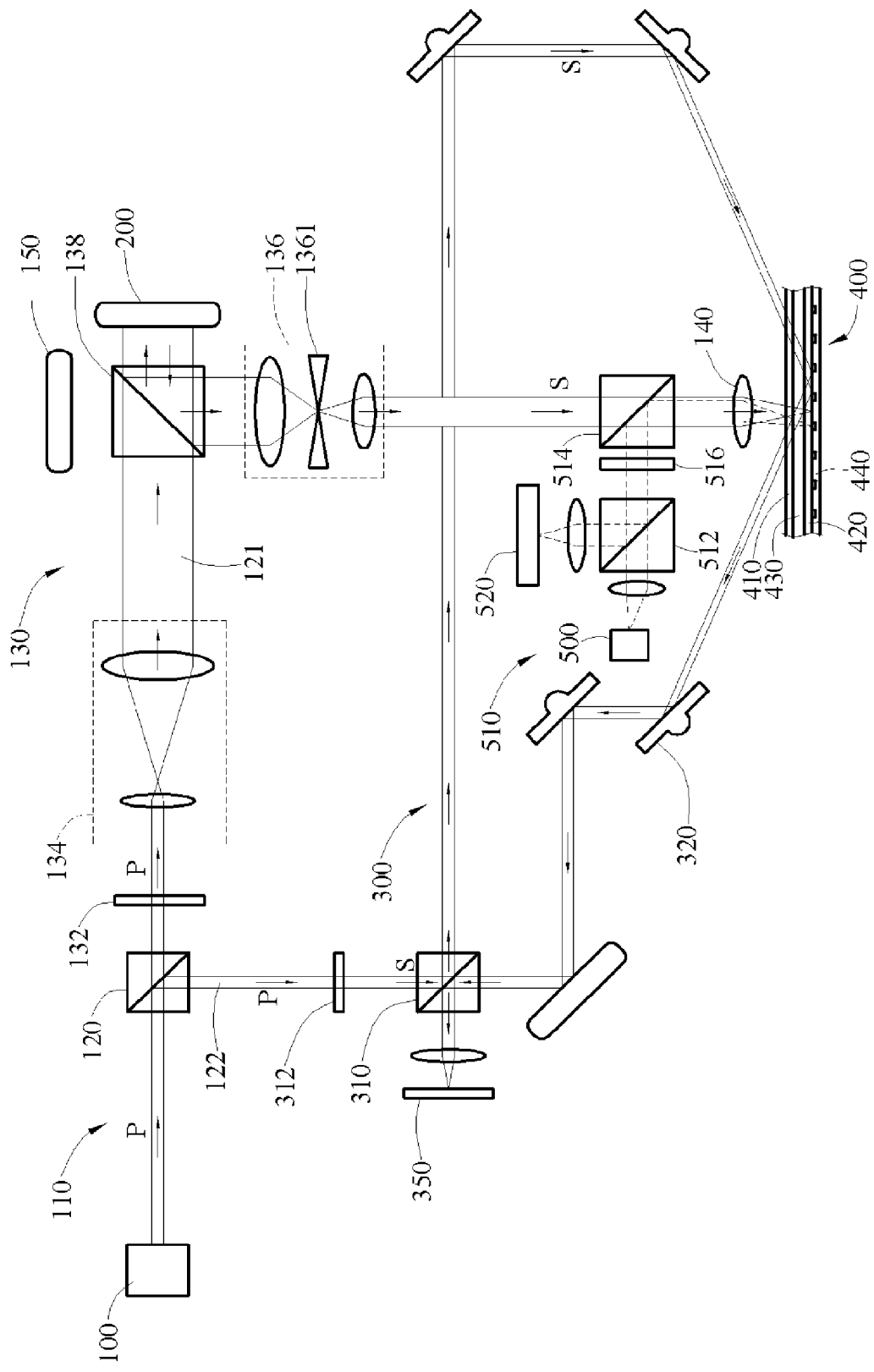
FIGS. 4A & 4B are the schematic diagrams of a holographic storage and regeneration system having servo mechanism according to a fourth embodiment of the invention.
Figure 4B:
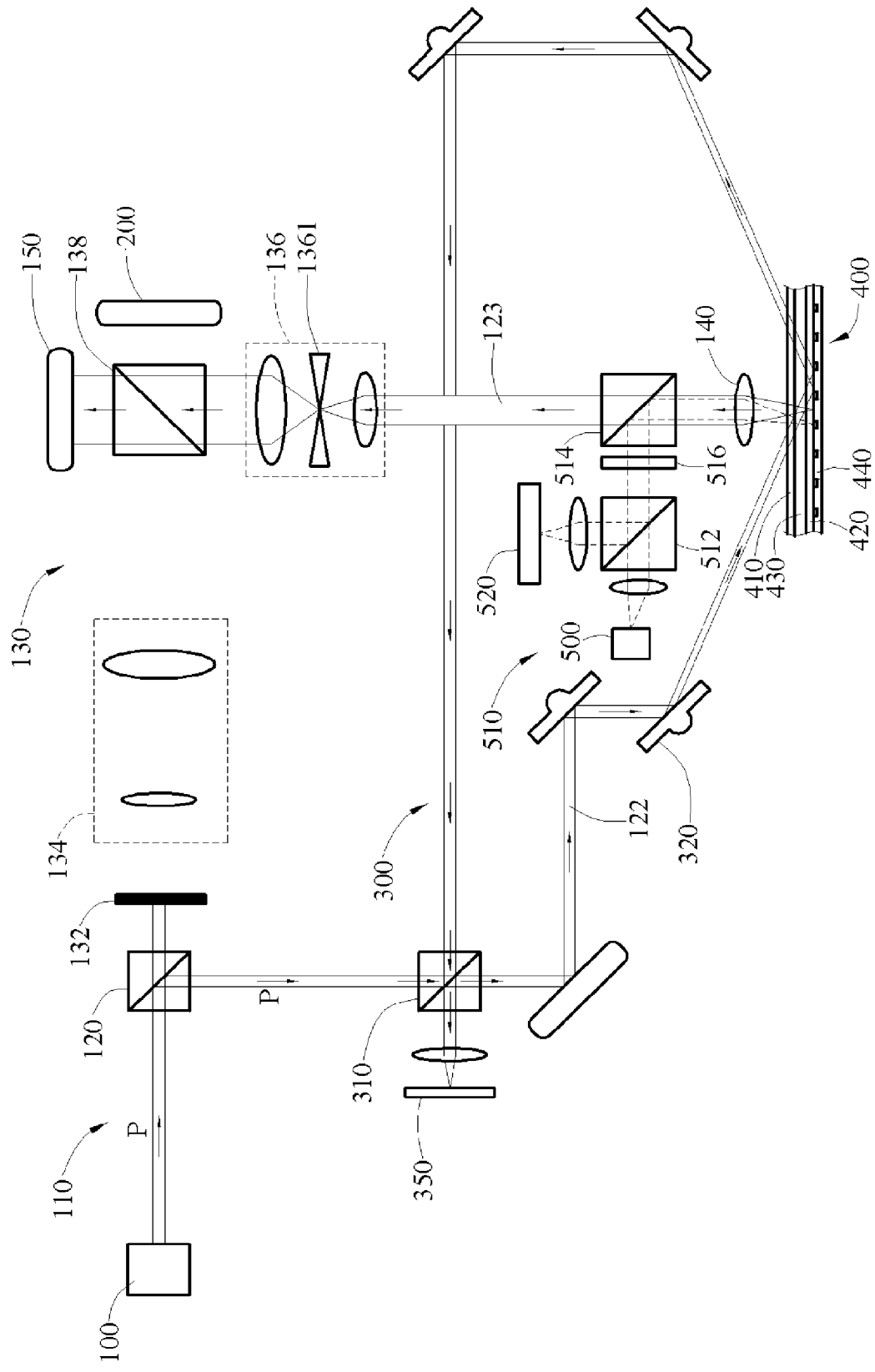

Subsequently, refer to FIGS. 4A & 4B for a schematic diagram of holographic storage and regeneration system having servo mechanism according to a fourth embodiment of the invention. The basic framework of the fourth embodiment is the same as that of the first embodiment, thus it will not be repeated here for brevity. However, the spatial light modulator 200 utilized in a third embodiment of the invention is a reflective type spatial light modulator, such as a Liquid Crystal on Silicon (LCOS). Since the LCOS is not provided with a polarization plate, thus when linearly polarized light having P polarization incidents upon an LCOS, the signal requires to be modulated is reflected by LCOS and is converted to an S polarization. When the light coming from light source passes through the first polarizing light splitter 120, it is splitted into a signal light 121 having P polarization, and a reference light 122 having S polarization upon passing through a second ½λ-wave plate 312. Then, the signal light 121 having P polarization incidents onto the above-mentioned reflective type spatial light modulator 200, and reflected by it and is converted to change its polarization into S polarization. Therefore, when the signal light 121 reflected by spatial light modulator 200 incidents again onto a second polarizing light splitter 138, it is reflected by second polarizing light splitter 138 and changes its direction, and incidents again onto the second set of lenses 136, so that signal light 121 incidents onto holographic storage medium 400 along the first direction, hereby interfering with reference light 101 having the same S polarization and producing holographic interference fringes 600.

Figure 4C:
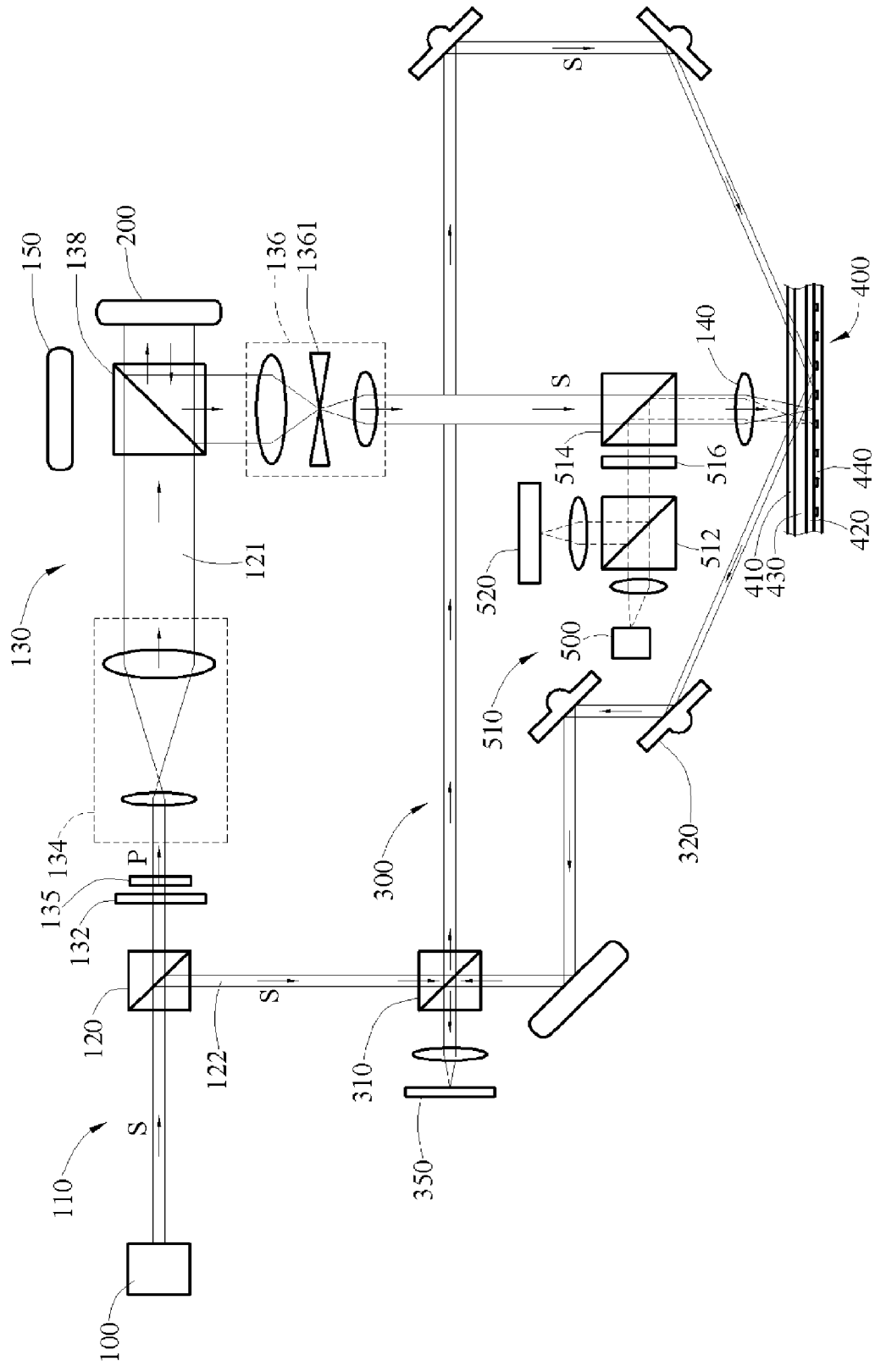
FIGS. 4C & 4D are the schematic diagrams of a holographic storage and regeneration system having servo mechanism according to a fifth embodiment of the invention.
Figure 4D:
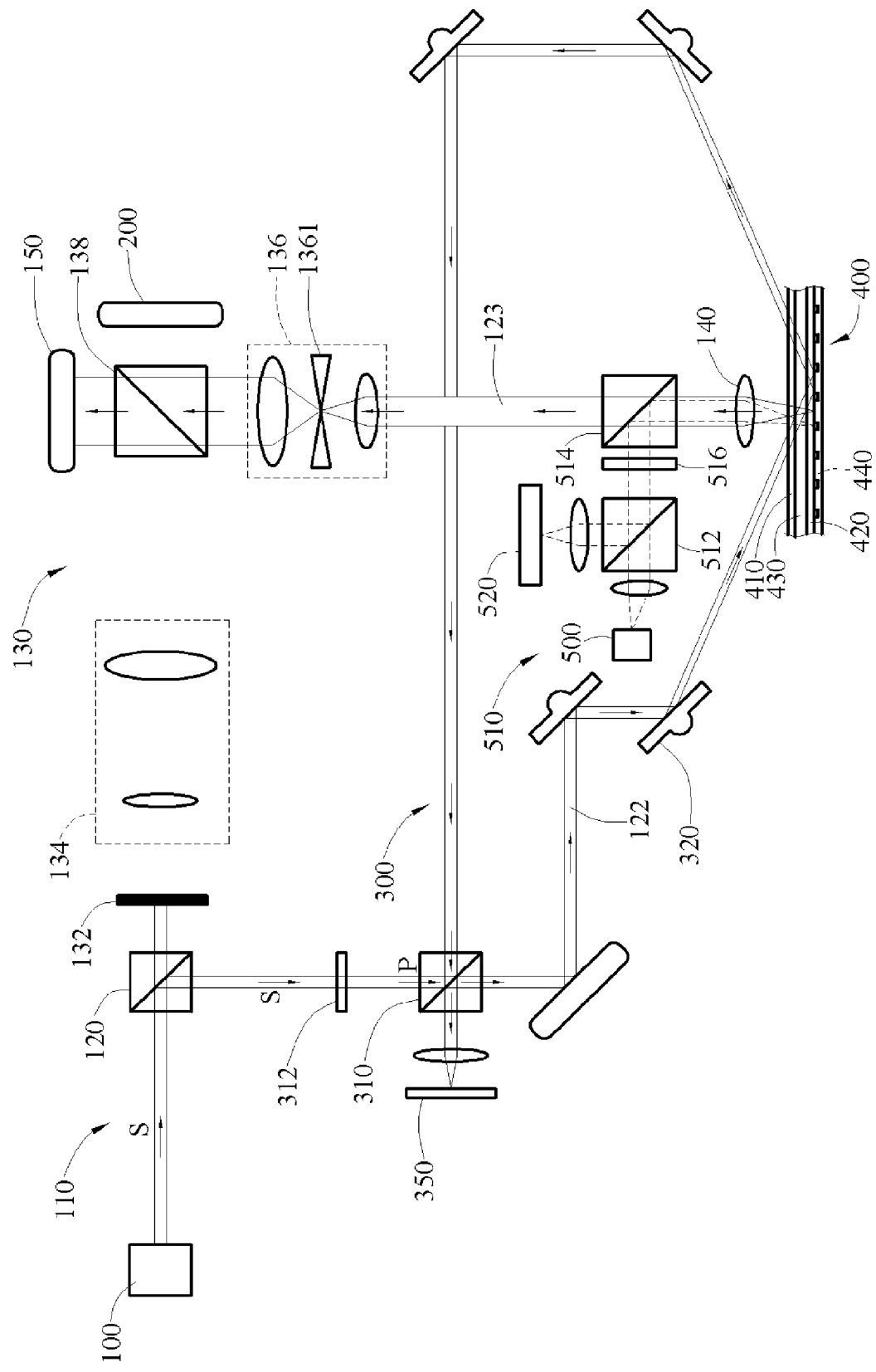

Moreover, refer to FIGS. 4C & 4D for a schematic diagram of holographic storage and regeneration system having servo mechanism according to a fifth embodiment of the invention. The basic framework of the fifth embodiment is the same as that of the second embodiment, thus it will not be repeated here for brevity. However, the major difference is that, in the fifth embodiment, the spatial light modulator 200 utilized is a reflective type spatial light modulator, such as a Liquid Crystal on Silicon (LCOS). Since LCOS is not provided with a polarization plate, thus when signal light 121 converted into a signal light having P polarization upon passing through a first ½λ-wave plate 135 is incident onto an LCOS, the signal requires to be modulated is reflected by LCOS and is converted to an S polarization.

Figure 5A:
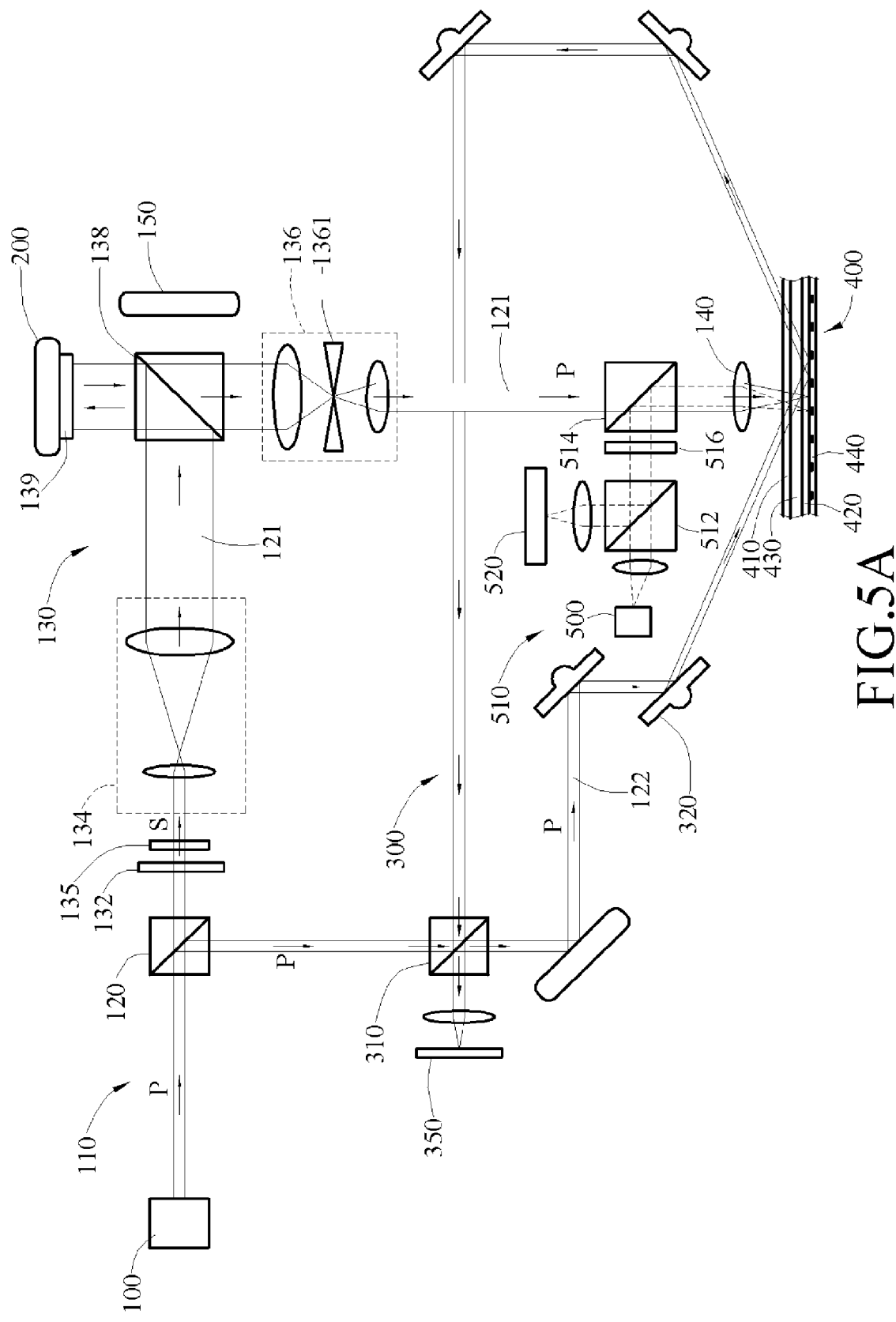
FIGS. 5A & 5B are the schematic diagrams of a holographic storage and regeneration system having servo mechanism according to a sixth embodiment of the invention.
Figure 5B:
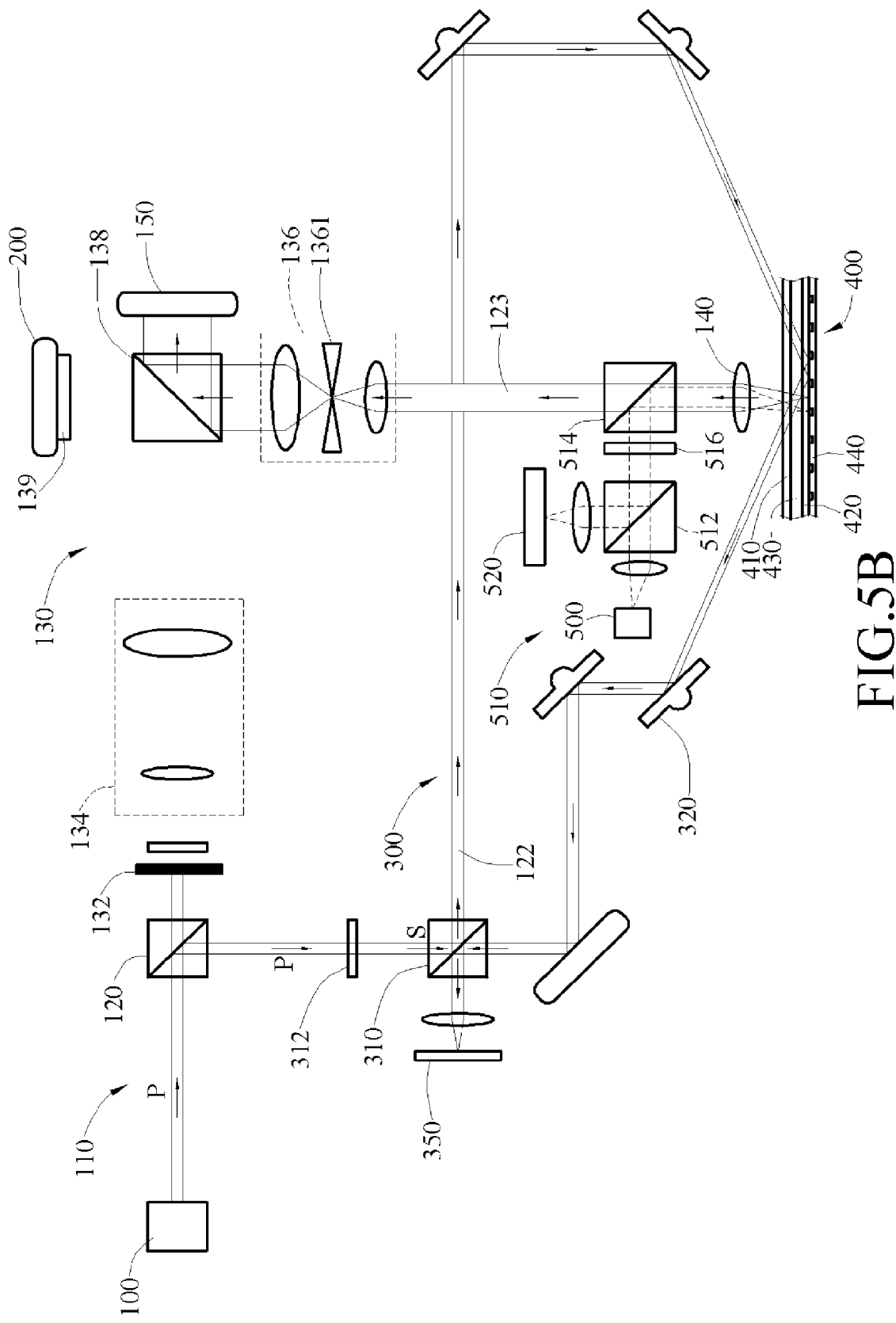

Then, refer to FIGS. 5A & 5B for a schematic diagram of holographic storage and regeneration system having servo mechanism according to a sixth embodiment of the invention. The basic framework of the sixth embodiment is the same as that of the first embodiment, as shown in FIG. 5A. In implementing data storage of the holographic storage and regeneration system, the linearly polarized light having P polarization is splitted by a light splitter 120 into a signal light 121 and a reference light 122, then the signal light is guided into a second light guidance portion 130. However, its major difference with the first embodiment is that, in the sixth embodiment of the invention, the second light guidance portion 130 is further provided with a first ½λ-wave plate 135, wherein, the first ½λ-wave plate 135 is placed behind a light shielding plate 132, so that signal light 121 having P polarization passes through light shielding plate 132 and incidents onto a first ½λ-wave plate 135, and is converted into a signal light 121 having S polarization, then it is expanded through a first set of lenses 134 and incidents onto a second polarizing light splitter 138, thus the signal light 121 having S polarization is reflected by the second polarizing light splitter 138 and changes its direction, and then incidents onto a spatial light modulator 200.

In this connection, through the application of a first ¼λ-wave plate 139 placed in front of spatial light modulator 200, thus the modulated signal light 121 having P polarization incidenting again onto second polarizing light splitter 138 may pass directly through it, and then incidents onto holographic storage medium 400 along the first direction. In this process, a reflective type spatial light modulator 200 is utilized, such as a Digital Micromirror Device (DMD).

Besides, in implementing data storage of holographic storage and regeneration system, the reference light 122 having P polarization is guided into a conjugate light guidance portion 300. At this time, the optionally placed second ½λ-wave plate 312 is removed from optical path of reference light 122, so that reference light 122 having P polarization may incident upon and pass through a second polarizing light splitter 310 directly, thus reference light 122 may incident onto holographic storage medium 400 through a set of rotatable reflection mirrors 320 in a reverse direction relative to the third direction, and interfere with the signal light having same P polarization, thus producing and recording holographic interference fringe 600 on a recording layer. Furthermore, reference light 122 is reflected by a reflection layer 440 in a reverse direction relative to a second direction, and after incidenting onto the set of rotatable reflection mirrors 320, it is guided into and directly passing through a second polarizing light splitter 310, and incidents into a first image sensor 350. In the sixth embodiment of the invention, the definitions of the second and third directions are the same as that in the first embodiment.

As shown in FIG. 5B, in implementing data regeneration of the holographic storage and regeneration system, a light shielding plate 132 of a second light guidance portion 130 is utilized to shield signal light 121, so that signal light 121 can not incident onto and proceed in a second light guidance portion 130. When reference 122 incidents onto a conjugate servo light guidance portion 300, a second ½λ-wave plate 312 is optionally placed between light splitter 120 and a second polarizing light splitter 310, and also on the optical path of reference light 122, such that reference light 122 having P polarization is converted into reference light 122 having S polarization, and then it is reflected by a second polarizing light splitter 310 and changes its direction, and then it is incident onto the set of rotatable reflection mirrors 320, and it is subsequently guided into incidenting onto holographic storage medium 400 in a second direction, thus it will be reflected totally by a reflection layer 440 of holographic storage medium 400. Upon accurately adjusting the reflected reference light 122, it incidents onto a holographic interference fringe of a recording layer 430 in a second direction, thus a conjugate regenerated light 123 is produced and is emitted in a reverse direction relative to the first direction. Since in proceeding with data regeneration, the light incidenting onto holographic storage medium 400 is reference light 122 having S polarization, therefore, the conjugate regenerated light 123 thus produced is also of S polarization, so that the conjugate regenerated light 123 incidenting onto second polarizing light splitter 138 in a reverse direction relative to the first direction is reflected and changes it direction, hereby incidenting onto a second image sensor 150.

Figure 5C:
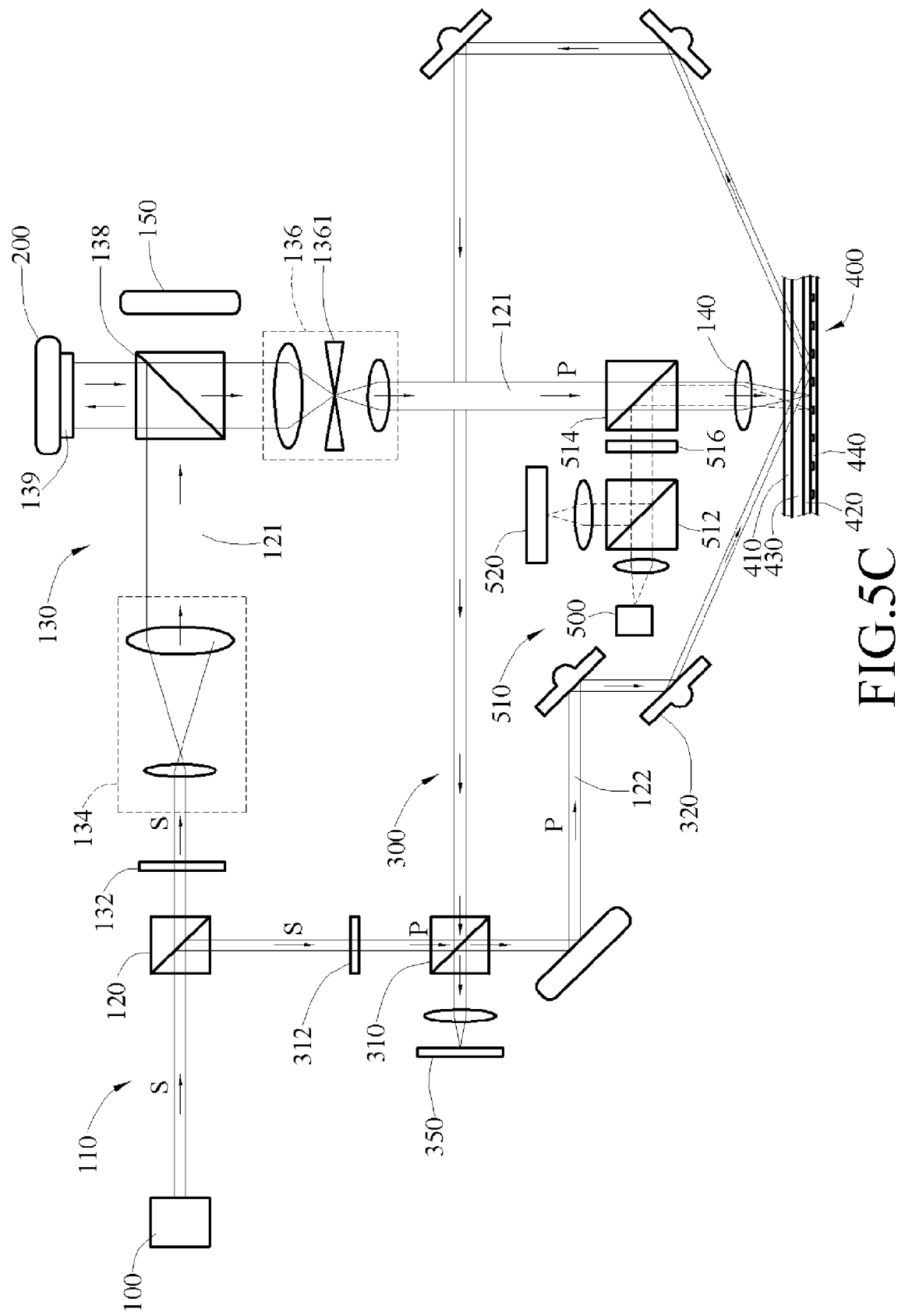
FIGS. 5C & 5D are the schematic diagrams of a holographic storage and regeneration system having servo mechanism according to a fifth embodiment of the invention.
Figure 5D:
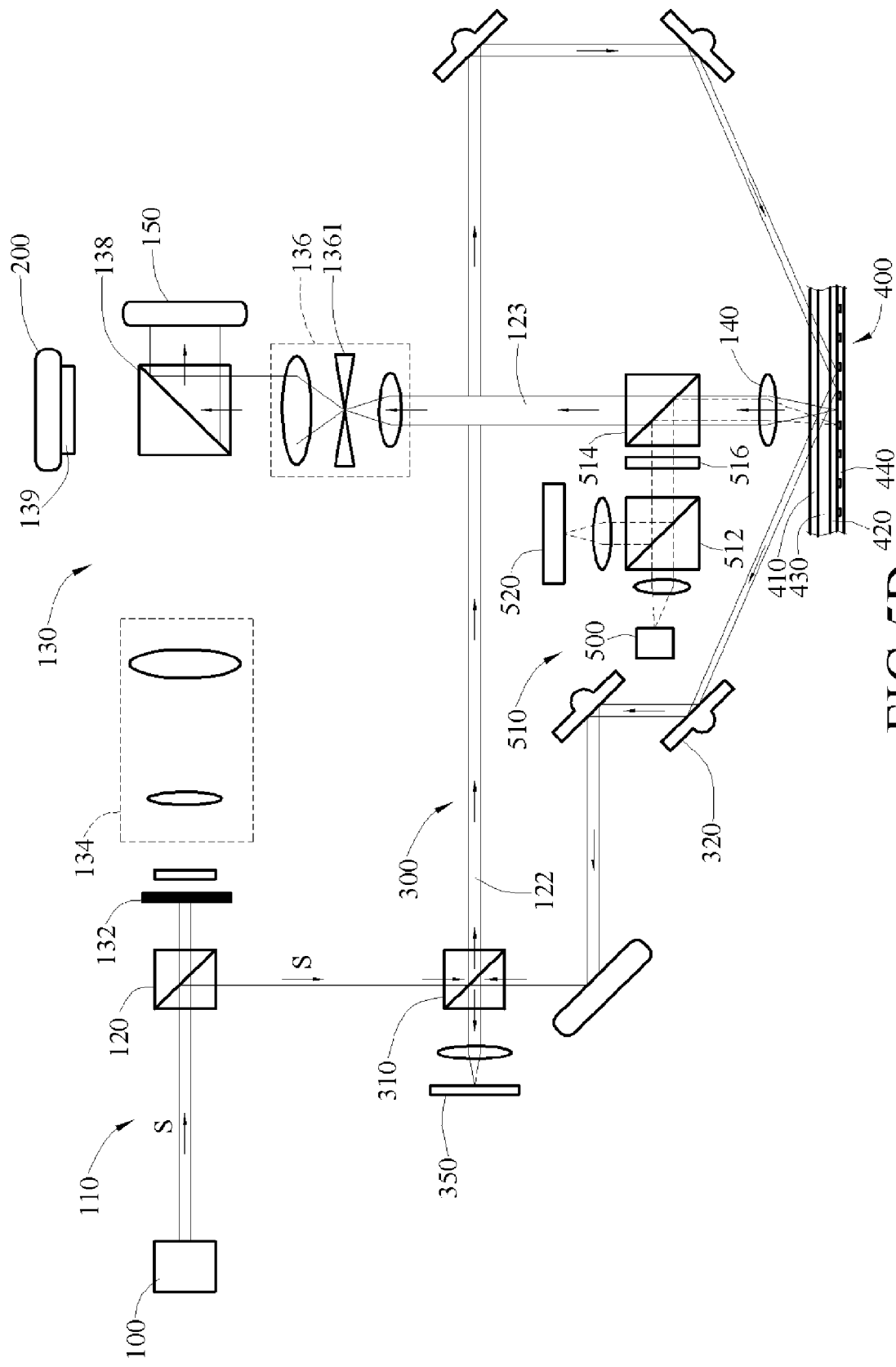

Furthermore, refer to FIGS. 5C & 5D for a schematic diagram of holographic storage and regeneration system having servo mechanism according to a seventh embodiment of the invention. The basic framework of the seventh embodiment is similar to that of the second embodiment, as shown in FIG. 5C. In implementing data storage of the holographic storage and regeneration system, the linearly polarized light having P polarization similarly emitted from a light source is splitted by a light splitter 120 into a signal light 121 and a reference light 122, then the signal light is guided into a second light guidance portion 130. However, its major difference with the second embodiment is that, in the seventh embodiment of the invention, the second light guidance portion 130 is utilized to replace the first ½λ-wave plate 135 placed behind a light shielding plate 132 and remove it from the optical path of signal light 121, so that signal light 121 is in P polarization state, and incidents onto holographic storage medium 400 in a first direction.

Moreover, in implementing data storage of holographic storage and regeneration system, the reference light 122 having S polarization is guided into a conjugate light guidance portion 300. At this time, a second ½λ-wave plate 312 can be placed selectively between a light splitter 120 and a second polarizing light splitter 310, and also on an optical path of reference light 122, so that reference light 122 having S polarization is converted into reference light having P polarization, hereby incidenting and directly passing through a second polarizing light splitter 310. Then, reference light 122 incidents onto holographic storage medium 400 through a set of rotatable reflection mirrors 320 in a reverse direction relative to the third direction, and interfere with the signal light 122 having same P polarization, thus producing and recording holographic interference fringe 600 on a recording layer.

As shown in FIG. 5D, in implementing data regeneration of the holographic storage and regeneration system, a light shielding plate 132 of a second light guidance portion 130 is utilized to shield signal light 121, so that signal light 121 can not incident onto and proceed in a second light guidance portion 130. When reference light 122 is incident onto a conjugate servo light guidance portion 300, a second ½λ-wave plate 312 can be selectively removed from the optical path of reference light 122, such that reference light 122 having S polarization is reflected by a second polarizing light splitter 310 and changes its direction, then it incidents onto the set of rotatable reflection mirrors 320, and is subsequently guided into incidenting onto holographic storage medium 400 in a second direction.

Similarly, the spatial light modulator 200 utilized in the sixth or seventh embodiments of the invention could be a reflective type spatial light modulator 200 utilized in the fourth or fifth embodiments, such as a Liquid Crystal on Silicon (LCOS), that could be used to replace the Digital Micromirror Device (DMD) and the first ¼λ-wave plate 139.

The above-mentioned first and second image sensors 350, 150, can be a charge-coupled device (CCD) or a Complementary Metal-Oxide Semiconductor (CMOS) respectively, as such achieving the image storage and analysis of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A holographic storage and regeneration system having servo mechanism, comprising:
   a holographic recording medium;
   a light source, used to generate a light beam that is split into a signal light and a reference light;
   a spatial light modulator, located on an optical path of said signal light, thus said signal light incident upon said spatial light modulator is modulated by it, and said signal light will then be incident upon said holographic recording medium along an incident direction of said signal light;
   a conjugate servo light guidance portion, used to guide said reference light to be incident upon said holographic recording medium along a specific direction, and thereby reflected by it to proceed in another direction, in this process, said reference light and said signal light interfere with each other, thus producing a holographic interference fringe in said holographic recording medium, and then the reflected reference light is guided into a first image sensor through said conjugate servo light guidance portion, and is utilized to adjust the incident angle of said reference light;
   a first light guidance portion, wherein said first light guidance portion further includes a light splitter, so that said light beam emitted from said light source is split into said reference light and said signal light both in a first linearly polarized state or a second linearly polarized state, and said first linearly polarized state is perpendicular to said second linearly polarized state; and
   a second light guidance portion, used to guide said signal light to be incident onto said spatial light modulator, and then said signal light will be incident upon said holographic recording medium along an incident direction of said signal light, further includes:
      a first set of lenses, comprising a plurality of lenses, wherein said lenses are used to expand said signal light; and
      a second set of lenses, comprising a plurality of lenses and a spatial filter element, wherein, said spatial filter element is disposed between/among said lenses, and is used to filter out the miscellaneous light other than said signal light and a conjugate regenerated light;
      wherein, when said reference light is again incident onto said holographic recording medium in a reverse direction relative to said another direction through said conjugate servo light guidance portion, it is reflected by said holographic recording medium, after that the reference light is reflected in a reverse direction relative to said direction, and when said reference light is incident again upon said holographic interference fringe, said conjugate regenerated light is produced and is incident upon a second image sensor along a reverse direction relative to the incident direction of said signal light.

2. The holographic storage and regeneration system having servo mechanism, as claimed in claim 1, wherein
   said second light guidance portion further includes an object lens, wherein, said object lens is used to converge said signal light to be incident onto said holographic recording medium.

3. The holographic storage and regeneration system having servo mechanism, as claimed in claim 2, wherein
   said second light guidance portion further includes a light shielding plate, disposed between said first polarizing light splitter and said first set of lenses, such that in carrying out data regeneration of said holographic storage and regeneration system, said light shielding plate can be selectively utilized to shield said signal light, so that said signal light is not able to be incident onto said holographic recording medium.

4. The holographic storage and regeneration system having servo mechanism, as claimed in claim 3, wherein said second light guidance portion further includes a first polarizing light splitter, disposed between said first set of lenses and said spatial light modulator, and is used to allow passage of linearly polarized light of first linear polarization state, reflect and change direction of the linearly polarized light of second linear polarization state perpendicular to said first linear polarization state.

5. The holographic storage and regeneration system having servo mechanism, as claimed in claim 4, wherein said spatial light modulator is a reflective type spatial light modulator, and is used to receive said linearly polarized light of said first linear polarization state passing through said first polarizing light splitter, and reflect said linearly polarized light of said first linear polarization state after modulation.

6. The holographic storage and regeneration system having servo mechanism, as claimed in claim 5, wherein said reflective type spatial light modulator is a Digital Micromirror Device (DMD).

7. The holographic storage and regeneration system having servo mechanism, as claimed in claim 6, wherein said second light guidance portion further includes a first ¼λ-wave plate, disposed between said first polarizing light splitter and said spatial light modulator, so that after said signal light is incident onto said first ¼λ-wave plate, said signal light is reflected by said spatial light modulator, and then it passes through said first ¼λ-wave plate again, so that said signal light is converted from being in said first linear polarization state to said second linear polarization state.

8. The holographic storage and regeneration system having servo mechanism, as claimed in claim 1, wherein
   the incident direction of said signal light is a direction that said signal light is incident at an angle perpendicular to the surface of said holographic recording medium, thus an acute angle is formed between an extension line in said direction and a surface of said holographic recording medium, and said direction is a direction that said signal light is incident obliquely onto said holographic recording medium at said acute angle, and said another direction is defined as a direction symmetric to said acute angle utilizing the incident direction of said signal light as a symmetric axis, the same acute angle is also formed between the extension line of said another direction and said surface of said holographic recording medium, and said another direction is a direction leading away from said holographic recording medium at said acute angle.

9. The holographic storage and regeneration system having servo mechanism, as claimed in claim 1, wherein
   said holographic recording medium comprises:
      a first substrate and a second substrate;
      a recording layer, formed between said first substrate and said second substrate, and used to record a holographic interference fringe formed by said signal light and said reference light; and
      a reflection layer, that is a multi-layer coated film formed on the bottom surface of said second substrate and is on an opposite side of said recording layer, said multi-layer coated film allows the transmission of said incident signal light, and affects total reflection of said reference light incident obliquely in said direction;

wherein, a servo track is formed on said reflection layer, and is composed of a plurality of recess holes and protrusion pieces, as such reflecting a focusing and track-finding servo light.

10. The holographic storage and regeneration system having servo mechanism, as claimed in claim 9, wherein
when said reference light and said signal light incident onto said reflection layer of said holographic recording medium, they have different reflection positions respectively.

11. A holographic storage and regeneration system having servo mechanism, comprising:
  a holographic recording medium;
  a light source, used to generate a signal light and a reference light;
  a spatial light modulator, located on an optical path of said signal light, thus said signal light incident upon said spatial light modulator is modulated by it, and said signal light will then be incident upon said holographic recording medium along an incident direction of said signal light;
  a first light guidance portion, wherein said first light guidance portion further includes a light splitter, so that light beam emitted from said light source is split into said reference light and said signal light both in a first linearly polarized state or a second linearly polarized state, and said first linearly polarized state is perpendicular to said second linearly polarized state; and
  a conjugate servo light guidance portion, used to guide said reference light to be incident upon said holographic recording medium along a specific direction, and hereby reflected by it to proceed in another direction, in this process, said reference light and said signal light interfere with each other, thus producing a holographic interference fringe in said holographic recording medium, and then the reflected reference light is guided into a first image sensor through a conjugate servo light guidance portion, and is utilized to adjust the incident angle of said reference light, wherein, said conjugate servo light guidance portion includes:
    a second $\frac{1}{2}\lambda$-wave plate, wherein, in carrying out the data storage of said holographic storage and regeneration system, said second $\frac{1}{2}\lambda$-wave plate can be selectively disposed on an optical path of said reference light, and is used to receive said reference light of said first linear polarization state and convert it into said reference light of said second linear polarization state;
    a second polarizing light splitter, wherein, in carrying out data storage of said holographic storage and regeneration system, said second polarizing light splitter is used to receive said reference light of said second linear polarization state incident from said second $\frac{1}{2}\lambda$-wave plate, then reflecting and changing direction of said reference light, and also reflecting and changing direction of said reference light of said second linear polarization state reflected by said holographic recording medium, and in carrying out data regeneration of said holographic storage and regeneration system, said second polarizing light splitter is used to receive said reference light of said first linear polarization state incident from said light splitter and allow it to pass through, and also receive said reference light of said first linear polarization state reflected by said holographic recording medium, and allow said reference light to pass through and incident onto said first image sensor; and
    a plurality sets of rotatable reflection mirrors, in carrying out data storage of said holographic storage and regeneration system, they are used to adjust said reference light passing through said second polarizing light splitter, and guide it to incident onto said holographic recording medium in said direction, and also guide said reference light reflected from said holographic recording medium to incident again onto said second polarizing light splitter, while in carrying out data regeneration of said holographic storage and regeneration system, said plurality sets of rotatable reflection mirrors are used to adjust said reference light to incident onto said holographic recording medium in said reverse direction relative to said another direction, and also guide said reference light reflected from said holographic recording medium to incident again onto said second polarizing light splitter;
  wherein, when said reference light is again incident onto said holographic recording medium in a reverse direction relative to said another direction through said conjugate servo light guidance portion, it is reflected by said holographic recording medium, after that the reference light is reflected in a reverse direction relative to said direction, and when said reference light is incident again upon said holographic interference fringe, a conjugate regenerated light is produced and is incident upon a second image sensor along a reverse direction relative to the incident direction of said signal light.

12. The holographic storage and regeneration system having servo mechanism, as claimed in claim 11, wherein
  the incident direction of said signal light is a direction that said signal light is incident at an angle perpendicular to the surface of said holographic recording medium, thus an acute angle is formed between an extension line in said direction and a surface of said holographic recording medium, and said direction is a direction that said signal light is incident obliquely onto said holographic recording medium at said acute angle, and said another direction is defined as a direction symmetric to said acute angle utilizing the incident direction of said signal light as a symmetric axis, the same acute angle is also formed between the extension line of said another direction and said surface of said holographic recording medium, and said another direction is a direction leading away from said holographic recording medium at said acute angle.

13. The holographic storage and regeneration system having servo mechanism, as claimed in claim 11, wherein said holographic recording medium comprises:
  a first substrate and a second substrate;
  a recording layer, formed between said first substrate and said second substrate, and used to record a holographic interference fringe formed by said signal light and said reference light; and
  a reflection layer, that is a multi-layer coated film formed on the bottom surface of said second substrate and is on an opposite side of said recording layer, said multi-layer coated film allows the transmission of said incident signal light, and affects total reflection of said reference light incident obliquely in said direction;
  wherein, a servo track is formed on said reflection layer, and is composed of a plurality of recess holes and protrusion pieces, as such reflecting a focusing and track-finding servo light.

14. The holographic storage and regeneration system having servo mechanism, as claimed in claim 13, wherein
when said reference light and said signal light are incident onto said reflection layer of said holographic recording medium, they have different reflection positions respectively.

15. The holographic storage and regeneration system having servo mechanism, as claimed in claim 11, wherein
said first linearly polarized state is a P polarization state, and second linearly polarized state is an S polarization state.

16. The holographic storage and regeneration system having servo mechanism, as claimed in claim 11, further including
a second light guidance portion, wherein, said second light guidance portion is used to guide said signal light to be incident onto said spatial light modulator, and then said signal light will be incident upon said holographic recording medium along an incident direction of said signal light.

17. The holographic storage and regeneration system having servo mechanism, as claimed in claim 16, wherein said second light guidance portion further includes:
a first set of lenses, comprising a plurality of lenses, wherein said lenses are used to expand said signal light; and
a second set of lenses, comprising a plurality of lenses and a spatial filter element, wherein, said spatial filter element is disposed between / among said lenses, and is used to filter out the miscellaneous light other than said signal light and said conjugate regenerated light.

18. The holographic storage and regeneration system having servo mechanism, as claimed in claim 17, wherein said second light guidance portion further includes an object lens, wherein, said object lens is used to converge said signal light to be incident onto said holographic recording medium.

19. The holographic storage and regeneration system having servo mechanism, as claimed in claim 18, wherein said second light guidance portion further includes a light shielding plate, disposed between said first polarizing light splitter and said first set of lenses, such that in carrying out data regeneration of said holographic storage and regeneration system, said light shielding plate can be selectively utilized to shield said signal light so that said signal light is not able to be incident onto said holographic recording medium.

20. The holographic storage and regeneration system having servo mechanism, as claimed in claim 19, wherein said second light guidance portion further includes a first polarizing light splitter, disposed between said first set of lenses and said spatial light modulator, and is used to allow passage of linearly polarized light of first linear polarization state, reflect and change direction of the linearly polarized light of second linear polarization state perpendicular to said first linear polarization state.

21. The holographic storage and regeneration system having servo mechanism, as claimed in claim 20, wherein said spatial light modulator is a reflective type spatial light modulator, and is used to receive said linearly polarized light of said first linear polarization state passing through said first polarizing light splitter, and reflect said linearly polarized light after modulation.

22. The holographic storage and regeneration system having servo mechanism, as claimed in claim 21, wherein said reflective type spatial light modulator is a Digital Micromirror Device (DMD).

23. The holographic storage and regeneration system having servo mechanism, as claimed in claim 22, wherein said second light guidance portion further includes a first ¼λ-wave plate, disposed between said first polarizing light splitter and said spatial light modulator, so that after incident onto said first ¼λ-wave plate, said signal light is reflected by said spatial light modulator, and then it passes through said first ¼λ-wave plate again, so that said signal light is converted from being in said first linear polarization state to said second linear polarization state.

* * * * *